(12) United States Patent
Roundtree

(10) Patent No.: US 11,361,107 B2
(45) Date of Patent: Jun. 14, 2022

(54) PRIVACY FRIENDLY COMMUNICATION BY OPERATION OF CLOAKED/DECLOAKED EMAIL

(71) Applicant: AutoGraph, inc., Seattle, WA (US)

(72) Inventor: Brian Roundtree, Seattle, WA (US)

(73) Assignee: Rally AG LLC, Kirkland, WA (US)

( * ) Notice: Subject to any disclaimer, the term of this patent is extended or adjusted under 35 U.S.C. 154(b) by 232 days.

(21) Appl. No.: 16/865,053

(22) Filed: May 1, 2020

(65) Prior Publication Data

US 2020/0349289 A1     Nov. 5, 2020

Related U.S. Application Data

(60) Provisional application No. 62/850,459, filed on May 20, 2019, provisional application No. 62/841,726, filed on May 1, 2019.

(51) Int. Cl.
     *G06F 21/62*      (2013.01)
     *H04L 51/48*      (2022.01)
     *G06F 16/955*      (2019.01)

(52) U.S. Cl.
     CPC ...... *G06F 21/6263* (2013.01); *G06F 16/9566* (2019.01); *H04L 51/28* (2013.01)

(58) Field of Classification Search
     CPC ... G06F 21/6263; G06F 16/9566; H04L 51/28
     See application file for complete search history.

(56) References Cited

U.S. PATENT DOCUMENTS

| | | | |
|---|---|---|---|
| 9,270,629 B2* | 2/2016 | Eichinger | H04L 51/28 |
| 2014/0373106 A1* | 12/2014 | Morgenroth | H04L 51/28 |
| | | | 726/4 |
| 2015/0256519 A1* | 9/2015 | Liebmann | H04L 63/0428 |
| | | | 713/168 |
| 2017/0032344 A1* | 2/2017 | Attolini | H04L 51/066 |

\* cited by examiner

*Primary Examiner* — Joe Chacko
(74) *Attorney, Agent, or Firm* — Perkins Coie LLP

(57) ABSTRACT

The disclosed tools include are tools to efficiently protect privacy for end users and others on the Internet when communicating with others. Specifically, tools disclosed include tools to enable an end user's device to communicate via email with others such as relying-parties such as merchants without revealing her information to the relying-party such as her email address, name or any other information she desires to keep confidential while still being able to have commercially useful transactions with the relying parties and others.

19 Claims, 21 Drawing Sheets

Privacy Friendly Communication via Cloaked & Decloaked Email

PRIVACY FRIENDLY COMMUNICATION BY OPERATION OF CLOAKED/DECLOAKED EMAIL

RELATED APPLICATIONS

This application claims the benefit of and priority to: U.S. Provisional Patent Application No. 62/841,726 filed May 1, 2019, and U.S. Provisional Patent Application No. 62/850,459 filed May 20, 2019 which are herein incorporated by reference in their entireties.

The following previously filed applications are herein incorporated by reference:

U.S. Provisional Patent Application No. 61/493,965;
U.S. Provisional Patent Application No. 61/533,049;
U.S. Provisional Patent Application No. 61/506,601;
U.S. Provisional Patent Application No. 61/567,594;
U.S. Provisional Patent Application No. 61/597,136;
U.S. Provisional Patent Application No. 61/603,216;
U.S. Provisional Patent Application No. 61/683,678;
U.S. Provisional Patent Application No. 61/724,863;
U.S. Provisional Patent Application No. 61/824,353;
U.S. Provisional Patent Application No. 61/972,193;
U.S. Provisional Patent Application No. 62/387,277;
U.S. Provisional Patent Application No. 62/418,743;
U.S. Provisional Patent Application No. 62/841,726;
CONSUMER DRIVEN ADVERTISING SYSTEM, U.S. patent application Ser. No. 13/490,444;
SYSTEM AND METHOD FOR DELIVERING ADS TO PERSONAS BASED ON DETERMINED USER CHARACTERISTICS, U.S. patent application Ser. No. 13/490,449;
METHOD AND APPARATUS FOR DISPLAYING ADS DIRECTED TO PERSONAS HAVING ASSOCIATED CHARACTERISTICS, U.S. patent application Ser. No. 13/490,447;
CONSUMER DRIVEN ADVERTISING SYSTEM, International Patent Application No. PCT/US12/41178;
CONSUMER SELF-PROFILING GUI, ANALYSIS AND RAPID INFORMATION PRESENTATION TOOLS filed Dec. 6, 2012, U.S. application Ser. No. 13/707,581;
CONSUMER SELF-PROFILING GUI, ANALYSIS AND RAPID INFORMATION PRESENTATION TOOLS, U.S. application Ser. No. 13/707,578 filed Dec. 6, 2012;
CONSUMER SELF-PROFILING GUI, ANALYSIS AND RAPID INFORMATION PRESENTATION TOOLS, PCT Application No. PCT/US12/68319 filed Dec. 6, 2012;
AD BLOCKING TOOLS FOR INTEREST-GRAPH DRIVEN PERSONALIZATION, U.S. patent application Ser. No. 13/843,635 filed Mar. 15, 2013;
REVERSE BRAND SORTING TOOLS FOR INTEREST-GRAPH DRIVEN PERSONALIZATION, U.S. patent application Ser. No. 13/843,270 filed Mar. 15, 2013;
TOOLS FOR INTEREST GRAPH-DRIVEN PERSONALIZATION, PCT Patent Application No. PCT/US13/32643 filed Mar. 15, 2013;
SELF-TARGETING ADVERTISING DATA COLLECTION AND PROCESSING TOOLS, U.S. patent application Ser. No. 14/078,515 filed Nov. 12, 2013;
SELF-TARGETING ADVERTISING DATA COLLECTION AND PROCESSING TOOLS, PCT Patent Application No. PCT/US2013/69766 (PCT) filed Nov. 12, 2013;
PRIVACY SENSITIVE PERSONA MANAGEMENT TOOLS, PCT Patent Application No. PCT/US14/38502 filed May 16, 2014;
PRIVACY SENSITIVE PERSONA MANAGEMENT TOOLS, U.S. patent application Ser. No. 14/280,480 filed May 16, 2014;
CONSUMER SELF-PROFILING GUI, ANALYSIS AND RAPID INFORMATION PRESENTATION TOOLS, U.S. patent application Ser. No. 14/460,319 filed Aug. 14, 2014;
BEACON BASED PRIVACY CENTRIC NETWORK COMMUNICATION, SHARING, RELEVANCY TOOLS AND OTHER TOOLS, U.S. patent application Ser. No. 14/672,007 filed Mar. 27, 2015;
BEACON BASED PRIVACY CENTRIC NETWORK COMMUNICATION, SHARING, RELEVANCY TOOLS AND OTHER TOOLS, PCT Patent Application No. PCT/US2015/23191 filed Mar. 27, 2015;
PRIVACY SENSITIVE PERSONA MANAGEMENT TOOLS, U.S. patent application Ser. No. 15/146,860 filed May 4, 2016;
CONSUMER AND BRAND OWNER DATA MANAGEMENT TOOLS AND CONSUMER PRIVACY TOOLS, U.S. patent application Ser. No. 15/171,997 filed Jun. 2, 2016;
CONSUMER AND BRAND OWNER DATA MANAGEMENT TOOLS AND CONSUMER PRIVACY TOOLS, PCT Patent Application No. PCT/US2016/035576 filed Jun. 2, 2016;
SENSOR BASED PRIVACY CENTRIC NETWORK COMMUNICATION, SHARING, RANKING TOOLS AND OTHER TOOLS, U.S. patent application Ser. No. 15/389,226 filed Dec. 22, 2016;
ENHANCED TOOLS TO PRESENT AND COLLECT USER INFORMATION FROM COMPUTING DEVICE SCREENS, U.S. patent application Ser. No. 15/805,689 filed Nov. 7, 2017;
REVERSE BRAND SORTING TOOLS FOR INTEREST-GRAPH DRIVEN PERSONALIZATION, U.S. patent application Ser. No. 15/923,510 filed Mar. 16, 2018;
CONSUMER SELF-PROFILING GUI, ANALYSIS AND RAPID INFORMATION PRESENTATION TOOLS, U.S. patent application Ser. No. 15/716,270 filed Sep. 26, 2017;
BEACON BASED PRIVACY CENTRIC NETWORK COMMUNICATION, SHARING, RELEVANCY TOOLS AND OTHER TOOLS, U.S. patent application Ser. No. 15/838,032 filed Dec. 11, 2017;
PRIVACY SENSITIVE PERSONA MANAGEMENT TOOLS, U.S. patent application Ser. No. 15/846,042 filed 18 Dec. 18, 2017; and
METHOD AND APPARATUS FOR DISPLAYING ADS DIRECTED TO PERSONAS HAVING ASSOCIATED CHARACTERISTICS, U.S. patent application Ser. No. 15/863,708 filed Jan. 5, 2018.

The technology in these applications as well as the current application are interoperable. If there are any conflicts, then the present application may control.

BACKGROUND

Modern consumers frequently have become the victims of data breaches, data misuse and other events that compromise their privacy on the Internet. However, it is rarely an option for a consumer (e.g., an end user) not to give out her personal information such as email information, name, phone number etc., and still conduct most any transaction in today's information centric economy. Such transactions including, but not limited to, ordering goods and services on-line, communicating with merchants, employers, government, friends, acquaintances and others etc., would be very difficult and inconvenient without such disclosure.

DETAILED DESCRIPTION

Overview

Specifically, what is needed are tools to efficiently protect privacy for end users and others on the Internet when communicating with others.

Figure 1:
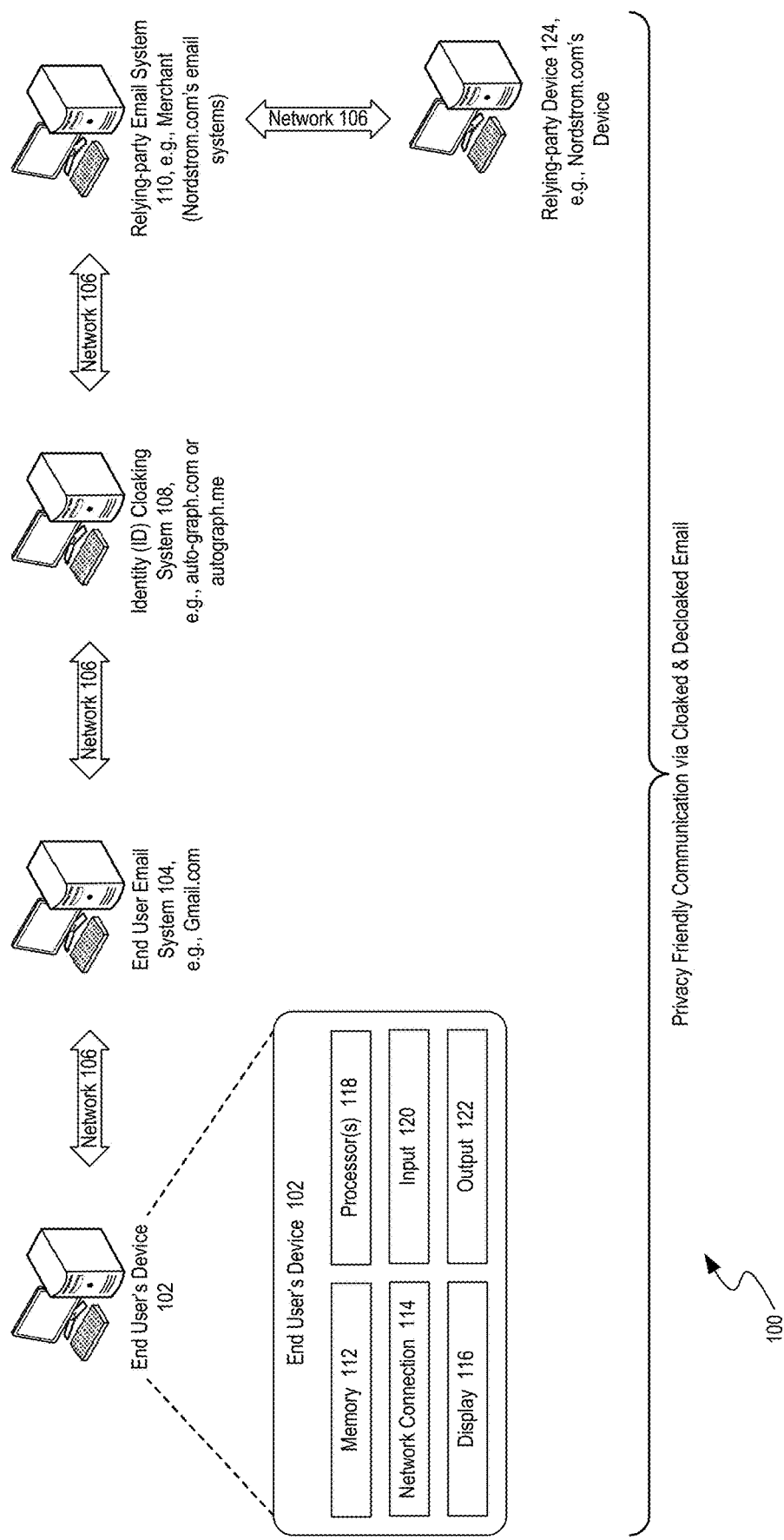
FIG. 1 illustrates an exemplary embodiment of privacy friendly communication via cloaked & decloaked email.

FIG. 1 illustrates an exemplary embodiment of some of the tools disclosed herein. Specifically, 100 is an exemplary illustration of tools to enable an end user's device 102 (e.g., a consumer's computing device) to communicate via email with others such as relying-parties (e.g., merchants, third parties, etc.) without revealing her information to the relying-party such as her email address, name or any other information she desires to keep confidential while still being able to have commercially useful transactions with the relying parties and others. The end user device maybe configured with email client software or any other tool to access email.

In this embodiment, end user privacy is protected by the use of an ID cloaking system which serves as an intermediary between the end user's email system and the relying-party's email system. Emails between the end user and relying-party are routed to the ID cloaking system before being delivered to the other party. This routing to the intermediary before delivery protects privacy by cloaking and de-cloaking confidential information in emails as they travel between these parties. The ID cloaking system may be processor based with processor electronics to execute the steps/instructions discussed herein.

More specifically, when emails from the end user to the relying-party (which contain private/confidential end user information) arrive at the ID cloaking system 108 (e.g., an ID cloaking server), the ID cloaking system swaps out or "cloaks" the private information before the email is routed to delivery to the relying-party. In place of the confidential information may be placeholders, pseudonyms, tokens, etc., which may be associated by any of the systems to a type of confidential information such as a last name placeholder. The end user can use a single email account to send and receive anonymized emails to multiple third parties. For example, the ID cloaking system 108 can manage emails between the end user email system 104 and email systems 110 associated with ad posting sites, dating sites, online vendors, exchanges (e.g., cryptocurrency exchanges), merchants, or the like.

Another benefit to this routing/use of the ID cloaking system intermediary is that it has similar benefits for emails sent from the relying-party back to the end user. Given the above, these emails which likely do not have private end user information (instead they use placeholder information), the ID Cloaking system inserts the user's private information or "de-cloaks" her private information before delivery to the end user.

This "cloaking" and "de-cloaking" of end user private information keeps the information from unwanted actors while still allowing the end user to get emails with her private information which is convenient as it gives context to the emails. In addition, during the email communication process, the disclosed tools described below enable emails exchanged between the end user and relying-party to maintain email chain threading. This is done by the ID cloaking system intermediary substituting email addresses as emails are sent between the end user and relying party. Email chain threading has the benefit of not only keeping the ID cloaking system as an intermediary but also protecting the end user's privacy and allowing deployment of the disclosed tools without the need to modify the end user email system 104 or relying party email system 110.

In this manner, the communication between the end user and relying-party happens transparently given neither the end user or merchant have to type in new email addresses etc., they only need "reply" to existing emails. As such, the end user's sensitive information (even her real email address) never falls into the hands of the merchants or others whose use of the information may be trusted but still are susceptible to data breaches.

Overview of ID Cloaking System Intelligent Routing Between the End User and the Relying Party The ID cloaking system maintains its status/function as an intermediary between the email servers by operation of intelligently interchanging/swapping/replacing "to" and "from", "reply-to" email addresses on emails as well as other information depending on which recipient the email is addressed to (the actual intended recipient). In this manner, any emails exchanged between the end user and relying-party will be delivered first to the ID cloaking system before being delivered to the other party for re-rerouting and privacy processing.

This intelligent assignment of the de-cloaking & cloaking addresses helps maintain email threading by keeping the ID cloaking system as an intermediary during the email correspondence between the end user and relying-party.

As discussed above, whether to "cloak" or "de-cloak" confidential information in an email may be based on which recipient the email address is addressed which indicates the actual intended recipient. For instance, the email is "de-cloaked" when the relying-party addresses the email to the end user's cloaked address. In a similar manner, the email is "cloaked" when the end user addresses the email to a relying party. In this embodiment, both the "cloaking" and "de-cloaking" email routes the emails to the ID cloaking system, where cloaking or de-cloaking occur before being forwarded on to the end user or relying-party email system. The ID cloaking system can be configured to execute the above based upon which recipient or sender is in each email and according to the end user's previously configured user profile. In some embodiments, the user can change his/her user profile to uncloak communications with selected relying-parties to allow the selected relying-parties to, for example, to view additional user information, such as the user's email address, name, contact information, etc.

As described below, these disclosed tools do not necessarily require any reconfiguration (while other embodiments illustrate some reconfiguration of some systems) of the end user email system 104 or the relying-party email system 110 or the relying party's device which simplifies deployment and associated costs. This is because the ID cloaking system's intelligent assignment of the cloaked address and de-cloaking addresses associated to the end user and relying-party leverage the SMTP routing that is used to route emails for delivery to an intermediate such as the ID Cloaking System 108 (e.g., ID cloaking system may assign email addresses to the same domain the ID cloaking system is associated to, such as autograph.me. This ensures delivery back to the ID cloaking system. In other embodiments it may be different domains). Also further explained below, ID Cloaking System 108 also swaps-in contextual information in the body or attachments of the email that may be sensitive and associated to the email address for the end user but swaps this information out when delivering email to the relying-party system 110 and relying-party device 124.

As illustrated, the end user's device 102 could be any computing device such as a phone, smart phone, tablet, laptop, game console, desktop, smart speaker, etc. Such devices may comprise memory 112, network connection 114, display 116, processor or processor electronics 118 ("processor 118"), input 120 and output 122, etc.

Network 106 or a combination of networks may allow the devices in FIG. 1 to communicate with each other.

Sample Cloaking ID Addressing Information

Figure 6:
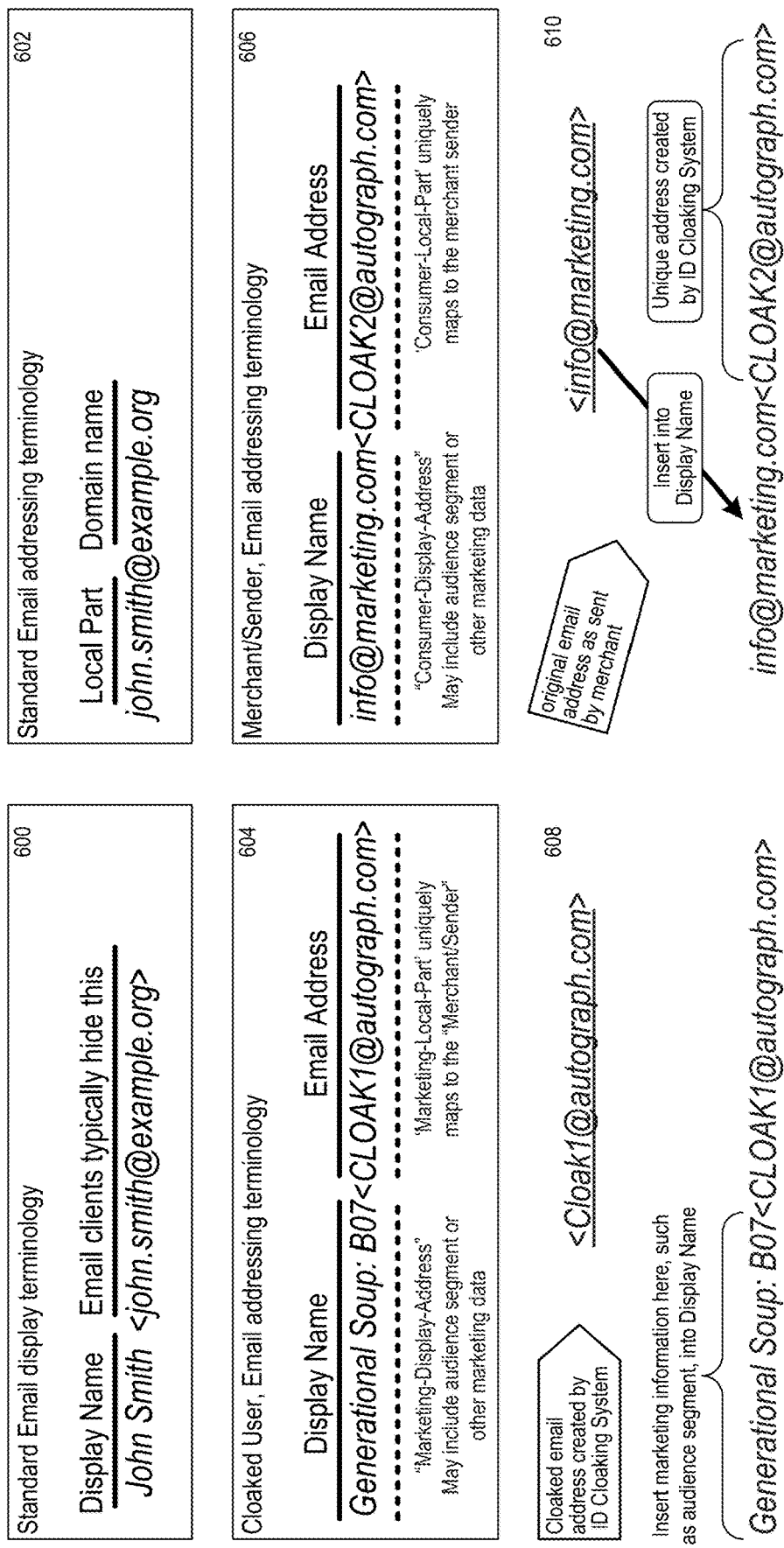
FIG. 6 illustrates an exemplary embodiment of tools to aid in routing emails to the ID cloaking system before delivery to the other party by using email domains.

As introduced above, cloaking and decloaking information in emails sent between the end user and relying party are facilitated by the ID cloaking system. Thus, it is helpful if the emails are routed to the ID cloaking system for cloaking/decloaking before delivery. FIG. 6 illustrates tools to aid in routing emails to the ID cloaking system before delivery to the other party by using email domains. The concepts of FIG. 6 are further discussed in relation to FIG. 4.

FIG. 6 illustrates standard email display terminology 600, standard email addressing terminology 602, cloaked user email addressing terminology 604, merchant/sender email addressing terminology 606, a cloaked email address 608 and an original email address 610.

Figure 5:
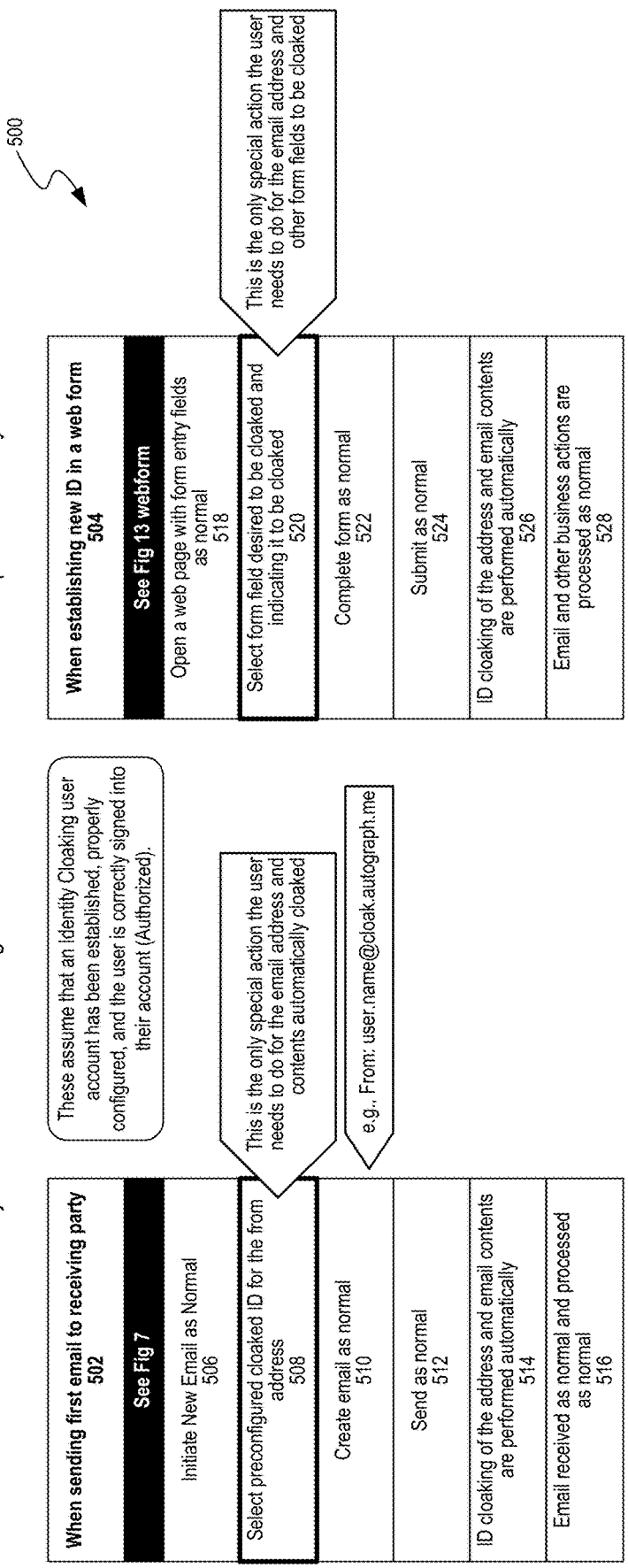
FIG. 5 illustrates an exemplary embodiment of a method to configure a new cloaked ID by the ID owner.

Overview of Methods to Configure/Use a New Cloaked ID with Little or No Effort by the End User (FIG. 5)

FIG. 5 illustrates a summary of some of the tools 500 for an end user to configure the initial use of a cloaked email address. As illustrated, there are two ways a user can initiate the initial use of cloaking and decloaking of email addresses/emails and other information: 1) by operation of a webform initiation and 2) by operation of sending an initial email to the relying party "end user email initiation". In some embodiments, the user uses an application installed on the portable user device (e.g., a smartphone, tablet, etc.) to initiate cloaking of an email address.

The operations in column 502 illustrate an embodiment (steps 506-516) for the end user to initiate cloaking and decloaking by sending an initial email to the replying party which triggers cloaking/decloaking. Sending email to a receiving party will be discussed in FIG. 7.

The operations in column 504 illustrate an embodiment (steps 518-528) for the end user to trigger cloaking and decloaking by first using a webform that routes information from the ID cloaking system to the relying party as opposed to the end user sending an initial email to the relying party. Establishing a new ID in a web form will discussed in FIG. 13.

Thus in 502 and 504, the ID cloaking system may serve as a cloaking/decloaking intermediary (the extent of which depends on different embodiments). For instance, the tools discussed typically send emails from the end user to the relying party using the ID cloaking system as an intermediary. The ID cloaking system is also used as an intermediary when the relying party sends emails back to the end user. The identity of the intended email recipient may determine how the tools deliver and display the email by changing the values of the display name, local part and domain name etc., by or with the help of the ID cloaking system.

In these embodiments, it is assumed that the end user will or has created an account at the ID cloaking system. This account may aid in interacting with the ID cloaking system such as by filling out the webform as well as associating emails/email addresses and other information in emails between the end user and the relying party. This helps the ID cloaking system or other system cloak or decloak information as discussed below.

Overview of End User Initiated Contact to Relying Party (Both Webform and Via Initial Email)

Figure 9:
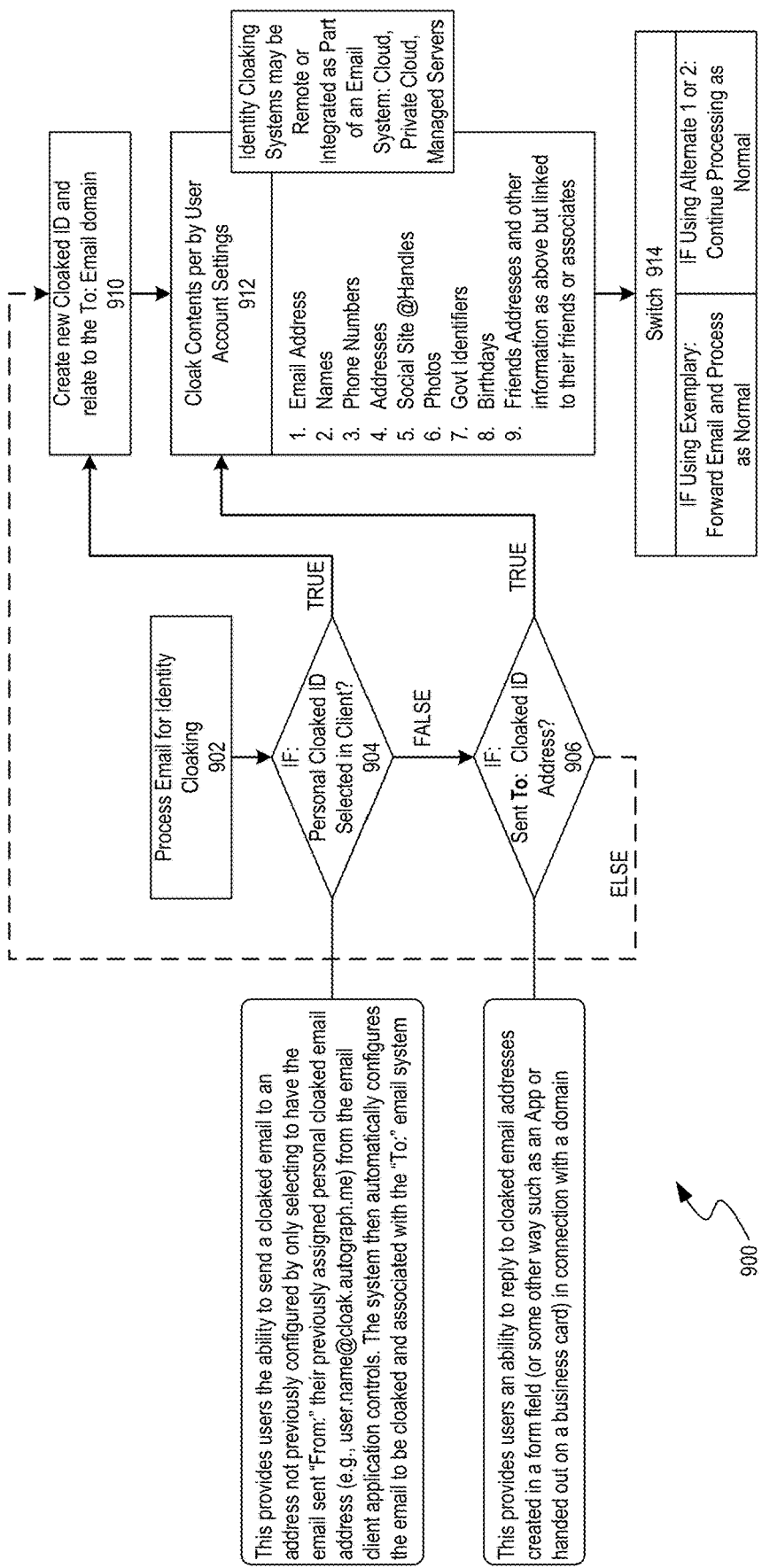
FIG. 9 illustrates an exemplary embodiment of an end user initiated contact to a relying party.

Process 900 in FIG. 9 illustrates an overview of two embodiments in which an end user can initiate email contact with a relying party 1) by filling out a webform; and 2) by sending an initial email to the relying party.

At 902, the end user wishes to initiate contact with a relying party using a cloaked ID to maintain her privacy. Here, the email is processed for ID cloaking. These steps may comprise determining the un-cloaked/actual ID of the end user, getting the end user's configuration setting that she set up in her account (e.g., on the ID cloaking system), and anything else that needs to be processed before the testing of the two illustrated conditional "if" statements. 904 is focused on the end user email initiated embodiment in which the end user sends an initial email to the relying party as opposed to initially using a webform for initial contact with the relying party. At 904, the end user email client/app/ device 102, is configured to determine if a previously created cloaked ID has been selected by the end user in the end user email client 102. As discussed here, this previously created cloaked ID may be associated to the user's real information and account/profile on the ID cloaking system 108.

At 904, the selected cloaked email serves as a pointer to the ID cloaking system 108 and also identifies that the end user sent the email to the cloaking ID server. If there is a cloaked ID selected in the client, then she proceeds to 910. If there is not, then we proceed to 906.

At 906, if there is no cloaked ID (e.g., user.name@cloak.autograph.me) selected in the end user email client 102, it is determined if the end user filled out a webform with a cloaked ID address such as in FIG. 9 (discussed more below). This step is focused on using the end user webform embodiment to initiate contact with the relying party. If there was a cloaked ID address sent in a webform, then she proceeds to 910.

If the end user has filled out a webform with a cloaked ID and transmitted the webform information to the relying party, then she proceeds to 912.

At 910 a new cloaked ID is created such as cloak3@autograhp.me. This may be different than the cloaked ID selected in 904 (user.name@cloak.autograph.me). This may occur at the ID cloaking system 108 or other system depending on the embodiment. Cloak3 may not contain confidential user information such as biran.roundtree@autograph.me etc.

At 912, typically the ID cloaking system 108 cloaks the user's confidential information which is associated to the new cloaked ID created in 910 or the cloaked address submitted in the webform in 906. This confidential information may have been stored in or associated with the end user's account and privacy settings she previously configured. Here, various pieces of private data can be cloaked by operation of replacement by place holders in the end user's communication submitted in 904 or 906.

At 914, the user's email can be sent to the relying party with cloaking information.

Figure 2:
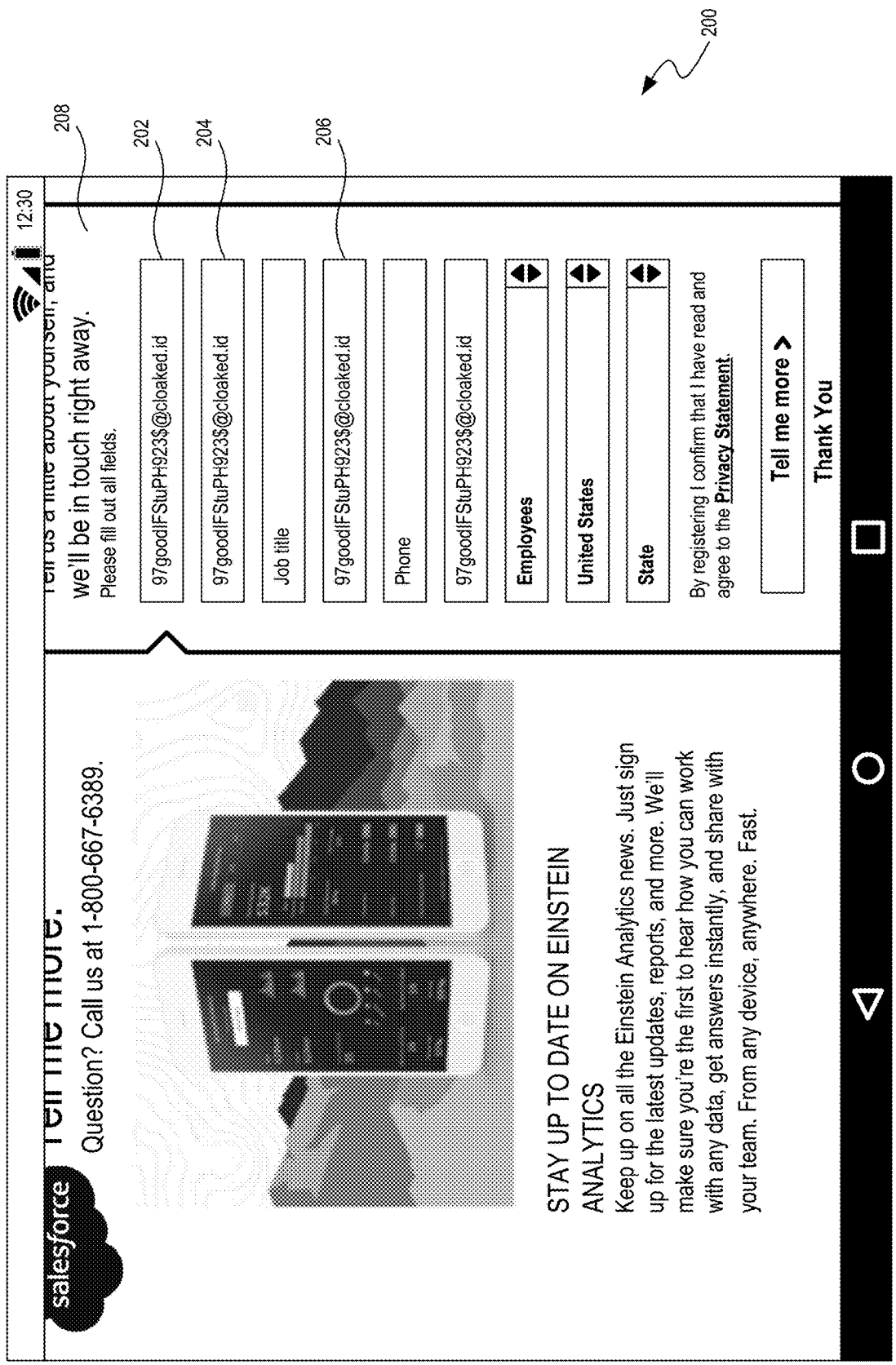
FIG. 2 illustrates an embodiment of a webform that may appear on an end user's device using the disclosed tools.

Overview of the Webform Section (FIG. 2)

FIG. 2 illustrates an embodiment of a webform that may appear on the end user's device 102 such as when a user browses the internet and goes to a relying-party's website. In this example, is salesforce.com (here a merchant relying-party). In this example, she may wish to contact salesforce using the provided webform. However, the end user wishes to keep some of her contact information (optionally any other information she wishes to keep confidential) out of the hands of salesforce. This is possible with the disclosed tools.

In this non-limiting example, she can easily facilitate the above by downloading a web plugin browser extension which is configured to interact with the ID cloaking systems 108 e.g., auto-graph's servers. In other embodiments, this browser extension can be substituted with a mobile device application or other tool. The browser extension could also be built into the browser itself.

Also assumed in this example is that the end user previously created a profile/person with the identity cloaking system 108. During the profile creation or even when filling out the webform, she was asked or can specify what information she wants to keep confidential from others such as the relying-party (she may choose different privacy preferences for different replying-parties). She can then disclose the confidential information and preferences to the ID cloaking system if desired, which is then associated to her ID Cloaking system account. For instance, during account creation or even while filling out the webform, the ID Cloaking System 108 asks for a first and last name, email address, phone number, Facebook™ account, Linkedin™ account, or any other information such as any GUID that can identify her or even clothing sizes, preferences (favorite color, brands, etc.). The end user is free to disclose any of this above information to the ID cloaking systems 108 and even specify sharing permissions such as what relying-party she wants to disclose this or not disclose to, conditions of disclosure etc. This information may be stored in a profile/persona stored on the ID cloaking systems. Said profile/persona is also described in the above referenced patent applications which can store end user brand preferences, statistical probabilities of end user characteristics, "Swote" data (see the above referenced patent applications), privacy preferences, beacon data and any other type of data.

Referring back to FIG. 2, once the consumer creates a profile on the ID cloaking system 108 and may sign into said profile via various ways such as through the browser extension, mobile application, or a webform 208 such as that in FIG. 2 may appear in 200 when she goes to a particular URL on the Internet. The consumer may be asked to specify what information she wants to share with the specific relying-party and what not to share. In this instance on the webform, fields 202 and 204 and 206 would normally ask for first, last name and email address respectively. She chooses via the webform or checkbox or other tools not to share her specific personal information, but instead selects to use cloaked information which will be shared to the relying party. Here the three fields are each filled in with the text, 97goodIFStuPh923$@cloaked.id. In this embodiment, the ID cloaking system 108 (FIG. 1) generated this cloaked string and associated it with the first, last name and email address.

Optionally, cloaked strings that are different may be associated with each field in the webform. For instance, the first name field may be filled by identity cloaking system 108 (FIG. 1) as #fname.cloak-1@auto-graph.com# and last name may be filled in with #lname.cloak-1@auto-graph.com# while email address may be filled in with #email.cloak-1@auto-graph.com#.

Here, each webform field's type of information e.g., last name is associated with not only the consumer's real information (if she chooses to disclose it to identity cloaking system 108—in this case "Smith"), but also is associated to the cloaked information that was generated by the identity cloaking system 108—in this case #lname.cloak-1@auto-graph.com#. To this end, the browser extension and ID cloaking system may examine the document object model (such as tags describing the HTML) of the webform and determine which field is associated to specific types of information e.g., which field is for last name, first name etc. These fields can be associated to the placeholder information as well as the real information if the end user discloses it to the ID cloaking system. The information and associations maybe stored by the ID cloaking system 108 or other systems as desired.

Also optionally associated to this information is the URL (including the domain) the webform was located at such as the address the salesforce form was from or other URL or file name or other designation of the relying party. As discussed below, the field types from the webform e.g., "last name" can be re-associated by the ID Cloaking system 108 to the cloaked information in order to de-cloak/associate to her information as described more below.

In one embodiment, the cloaked email: cloaked-1@auto-graph.com can be used multiple times for different web-forms or used just once each time a user needs a new information placeholder value which may be for each different URL or webform she fills out or for each of the fields in the webform. These can serve as a Globally Unique IDs (GUID) to identify her when her real information needs to be re-associated and/or to re-route information such as emails back to her. In this non-limiting example, the domain of the address is the same as the ID cloaking system's domain. This serves to route emails through the same server to keep email threading continuity etc., as explained below.

Webform Example

Figure 3:
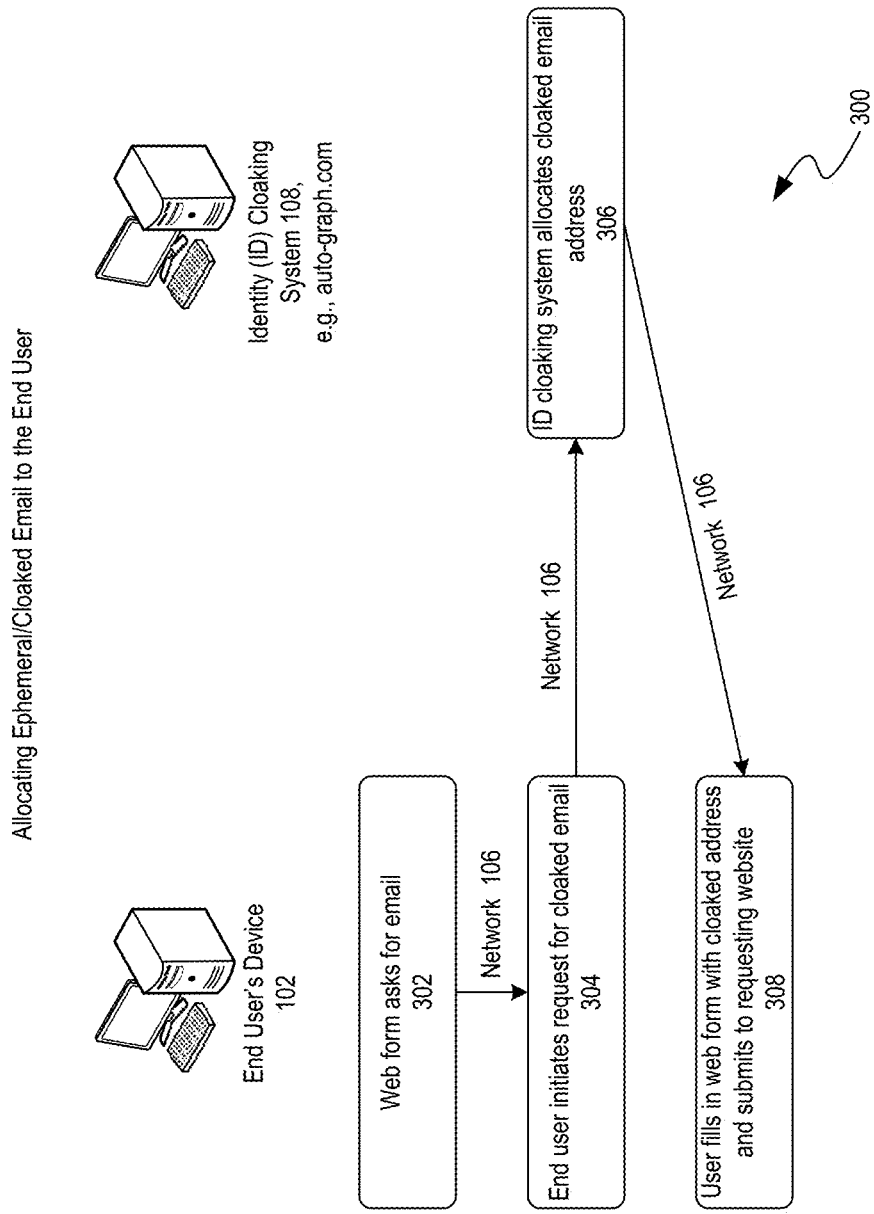
FIG. 3 illustrates an exemplary embodiment of allocating ephemeral/cloaked email to the end user.

FIG. 3, illustrates an exemplary embodiment of allocating an ephemeral/cloaked email to the end user using the webform from FIG. 2. In process 300, first the end user's device 102 may download the web browser plugin/extension for interacting with the ID cloaking systems 108 from the Google Play Store™ for Google Chrome™ or other source. Once, the plugin is installed with the web browser such as Google Chrome, the end user may sign into a previously created profile/persona on or associated to ID cloaking systems 108 or create a new profile. In the above referenced patent applications this may be by operation of the audience engine or federated ID servers or other server that may store profiles/personas that may be in communication or the same server as the ID cloaking system 108.

The end user then goes to the URL with the desired webform. The web browser then displays the webform like in FIG. 2 and asks for in this case in FIG. 3, an email address at 302. The end user then initiates a request for a cloaked email via the ID cloaking systems 108 at 304. At 306, the ID cloaking systems 108 allocate the cloaked email address and transmits that back to the end user device 102 which may fill in the appropriate box in the webform. Here, the cloaked email address, the URL the webform was at, the end user's actual email address, the user's account on the ID Cloaking System and any other type of information may be associated together. These associations can be stored at the ID cloaking systems 108 or at any other location such as the end user's device.

At 308, the user fills in the webform with the cloaked email address and submits the webform with the information from the ID cloaking system to the requesting website 308. In a like manner, this process repeats for various other fields in the webform that the user selects and this information can be associated to the end user's profile.

As such, given the tools above which cloak the user's desired information, the relying-party or other recipient, only has what information the end user wishes (e.g., an optional message text in the webform, checkboxes checked etc.) plus the "cloaked" information from the ID cloaking system (e.g., confidential information placeholders). This still permits the relying-party recipient to fulfill whatever wishes the end user wishes despite not having the information itself e.g., by operation of a cloaked email address etc. As illustrated more below, the cloaked information that the relying-party did receive will enable the ID cloaking systems and any applicable email systems to route information back and forth between the end user and relying-party without comprising end user privacy.

Figure 4:
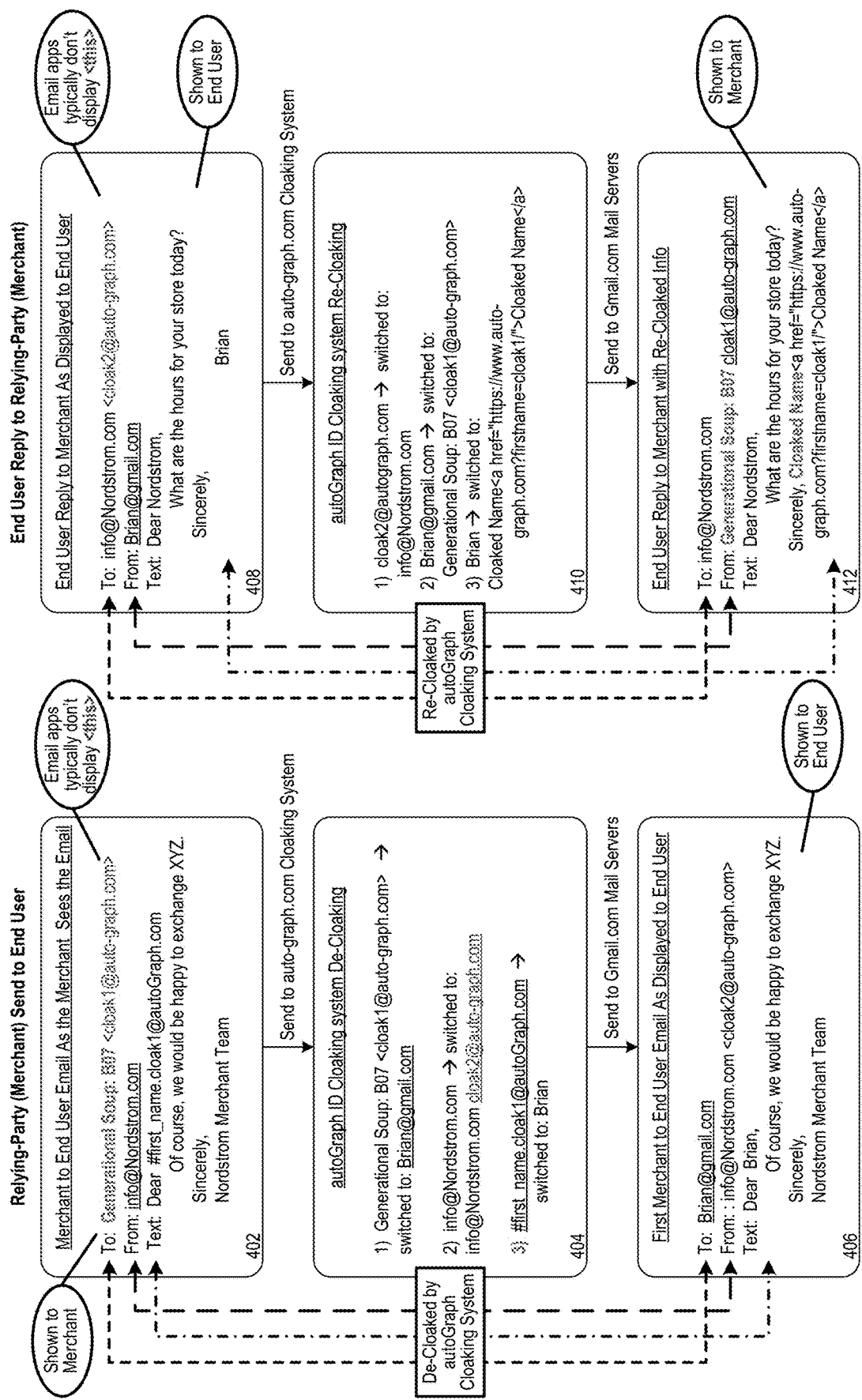
FIG. 4 illustrates an exemplary embodiment of email communication between a relying-party who received information from a webform and an end user who filled out the webform.

Sending Emails Between End User & Relying-Party Section Using Both the Webform Initiated Embodiment and the End User Email Initiated Embodiment 400 in FIG. 4, illustrates an exemplary embodiment of email communication between a relying-party who received information from a webform like that in FIGS. 2-3 and an end user who filled out the webform. These tools may also work in a similar manner in the end user email initiated embodiment introduced above.

In the example in FIG. 4, when the end user previously filled out a webform like that in FIGS. 2-3, he chose to "cloak" his first name, last name and email address while filing out a webform at the Nordstroms.com™ URL to return an item "XYZ" (such as a shirt or hat). As such, when he filled in the form, like in FIG. 2, the fields for first and last name and email address were filled out with the following (in place of his confidential information) which may have been generated by the ID cloaking systems which were in communication with his device by operation of the browser extension: #first_name.cloak1@auto-graph.com, #last_name.cloak1@auto-graph.com and cloak1@auto-graph.com respectively. The ID cloaking system 108 associated the real values of these fields which are Brian, Roundtree and brian@gmail.com respectively. These values may be stored on the ID cloaking systems in association with his account/profile.

Continuing on in FIG. 4, 402, the relying-party decided to reply to the end user as a result of the user's webform information submitted above. In this embodiment, the relying-party therefore only has the cloaked email address of the user cloak1@auto-graph.com and not the end user's real email address. As such, the relying-party then sends an email to that address. Since the relying-party does not have the end user's first name, the text of the email specifies #first_name.cloak1@auto-graph.com as a placeholder for the end user's real first name etc. This placeholder maybe recognized as a placeholder by the ID cloaking system and/or the replying party or other systems. This may be accomplished by previous configuration to look for strings of this nature or other tools such as looking for keywords, field names etc.

Optionally, as illustrated in 402, the value "Generational Soup: B07" maybe added to the "To:" line by the relying party. This value may represent an audience segment e.g., "millennials without money", "rich baby boomers" etc. Other segments used by marketing firms may be used. This audience segment may have been associated to the end user's profile when filling out the webform. Assuming he was signed into his profile via the browser plug-in/extension while filing out the webform, the end user may be have been asked to give his permission for disclosure on the webform and use by the relying-party. Or the relying party may have assigned him to this audience segment using its marketing tools. The value may optionally be included in the email in 402 or perhaps just stored on the relying-party's server associated with the end user's account and not displayed to the end user.

In 402, the relying-party drafts and sends an email to the cloaked email address which is intended to be displayed to the end user. In this example, said cloaked email address has a domain associated to the ID cloaking system to route the email to the cloaking ID system (e.g., auto-graph.com) so the following intermediary steps can be done by the cloaking ID system.

Once the email at 402 arrives at the ID cloaking system at 404, the ID cloaking system is configured to recognize and "de-cloak" the email so that it not only can be delivered to the end user's real confidential email address, but also give context to the information in the email by swapping the end user's confidential information into the email with the placeholders. As seen below, additional information such as a "reply to" address is added to this email so if the end user replies to this email, routing and end user information privacy can be maintained (by keeping ID cloaking system 108 as an intermediary). Else, if the user hit the reply to button with the "info@Nordstrom.com"—her information would be inadvertently revealed to the relying party.

Specifically, in 404, the "de-cloaking" by operation of the ID cloaking system, replaces the cloaked information that was previously submitted to the relying party with the associated end user's confidential information and any other desired information such as any information in his profile. Here, the ID cloaking system 108 re-associates the email address cloak1@auto-graph.com with brian@gmail.com which were previously associated to the webform for merchant item returns that the user previously filled out like in FIG. 2. Recognition and association between the email, replying party, end user, end user profile etc., can be done through the previous associations above e.g., information collected during filling out the webform. These associations may be stored in the end user profile.

This reassociation maybe by associating the cloaked email to that of the end user's account, the URL the end user filed out with these specific cloaked values and also to his real email address. In addition, the cloaked email address maybe associated to the user's real first and last name, his account/profile/person on the ID cloaking system and/or audience engine or any other desired information that may or may not have been disclosed to the relying-party via the webform. See FIG. 11 for more.

Also based on the associations previously created between the placeholders/cloaked information and confidential information as a result of the end user filling out the webform, several other pieces of information in 402 are associated and replaced and/or augmented with other information in 404 (e.g., de-cloaked for the end user). For instance, the audience segment and cloaked email Generational Soup: B07 cloak1@auto-graph.com is switched/replaced with brian@gmail.com. This replacement helps route the email from 402 to the end user's real email address. Also, in most cases, the end user does not have to know or be reminded of his audience segment.

In addition the ID cloaking system may optionally scan the email and its attachments if any, for text strings representing information/placeholders/cloaked information the end user previously submitted via the webform such as: #first_name.cloak1@auto.Grpah.com. The ID cloaking system's previous association with this string to the end user's first name is recognized when the ID cloaking system scans the email for such placeholder strings. When a recognized placeholder string is found, this triggers a switch/replacement or swap of information or a decloaking of information by the ID cloaking system or other servers. Thus, this string is replaced with Brian in the body of the email (the email text) as illustrated in 406.

In addition, in 404, in anticipation of the end user sending a response to the email in 404 (which is discussed in 408), a second address is assigned and associated with the relying-party sender's email in 404 by the ID cloaking system. Specifically, info@Nordstrom.com is associated with the address <cloak2@auto-graph.com>. As seen below, this association will enable the end user to keep his information private during email exchanges by keeping the ID cloaking system as an intermediary when the end user replies. As illustrated, these replaced addresses are info@Nordstrom.com <cloak2@autograph.com> which provides a different "reply to" address than the original sender/relying party, yet gives the end user context of the real/actual sender of the email 402 which was info@Nordstrom.com. The above information may be associated and stored in the end user's profile.

After the switching/augmentation of the placeholder information in the email 402 in 404, the email is then sent by the ID cloaking system to the end user's email system 104 at the end user's actual email address e.g., via the domain in his email address such as gmail.com. In 406, the email arrives for display to the end user. Then this email arrives the end user's private information has been de-cloaked by the ID cloaking system and augmented with the second cloaked address (cloak.2@auto-graph.com) associated to the relying-party sender for use when responding to the relying-party in the steps below. This de-cloaked information also gives context to the communication and helps remind the user of what the communication is about, personalizes the email etc.

End User Replying to the Relying-Party

In 408, the end user decides to reply back to the relying-party in response to receiving the email in 406. Typically, the end user would start by just hitting the reply icon or button or other mechanism. The end user may simply reply normally by operation of her normal website email or any email application such as Microsoft Outlook. Given the configuration of the "from" address of the relying-party in 406 (e.g., From: info@Nordstrom.com <cloak2@auto-graph.com>), the message that is to be sent back to the relying-party in 408 will be routed to the ID cloaking systems and not directly to the email address (e.g., not directly to info@Nordstrom.com). As seen below, this will be to maintain the confidentiality of end user information by routing the email containing his confidential information first through the ID cloaking system intermediary for cloaking of the end user's confidential information.

More specifically, when the user hits reply in 408, the message will initially go to cloak2@auto-graph.com and not directly to info@Nordstrom.com. This initial routing to the ID cloaking system intermediary will allow the stripping/replacing/swapping of his sensitive information by the ID cloaking systems before finally being forwarded to the real relying party address of info@Nordstrom.com.

Thus, when the end user chose to "reply to" the email received in 406 in 408, the end user writes a response to the message from 406. The end user may even include his private information in the body of the email and/or attachments without fear of losing his privacy. In addition, the user can include use his real email address in the "from" field in 408 and it will not compromise that address as seen below. This is because all of the information in 408 will be "re-cloaked" by the ID cloaking system before delivery to the relying-party according to his wishes when he filled out his profile/filling out the webform like in FIG. 2.

Once the end user sends the email in 408, the email is routed to the ID cloaking system. Here, the end user's confidential information is "re-cloaked". Specifically looking between 408 to 410—the ID cloaking systems aid in changing/swapping the end user's email address back to the cloaked address (Brian@gmail.com to cloak1@auto-graph.com) as well as scanning the body and/or email attachments for confidential information and swapping information the end user previously specified (when configuring his profile or in the webform) as confidential/sensitive e.g., Brian to placeholders like: Cloaked Name<a href="https://www.auto-graph.com?firstname=cloak1/">Cloaked Name</a>. In addition, the address assigned to the relying-party cloak2@auto-graph.com can be stripped out of the email. In one embodiment, recognition and association of this information may be added by the previous associations stored in a end user profile e.g., a cloaked email was issued to a particular sender/recipient which indicates a particular user profile etc.

Then the ID cloaking system may send the email to the relying-party email system 110 for delivery to the relying-party.

Thus, the re-cloaking from 408 to 410 thus uses the ID cloaking system as a facilitator for this process. The tools disclosed do not require any expensive or tedious changes to the end user or relying-party's computing device.

As seen in 412, the delivered mail to the relying-party does not contain any of the private information previously designated by the end user. In place of this is the cloaked information that serves as placeholders.

Figure 7:
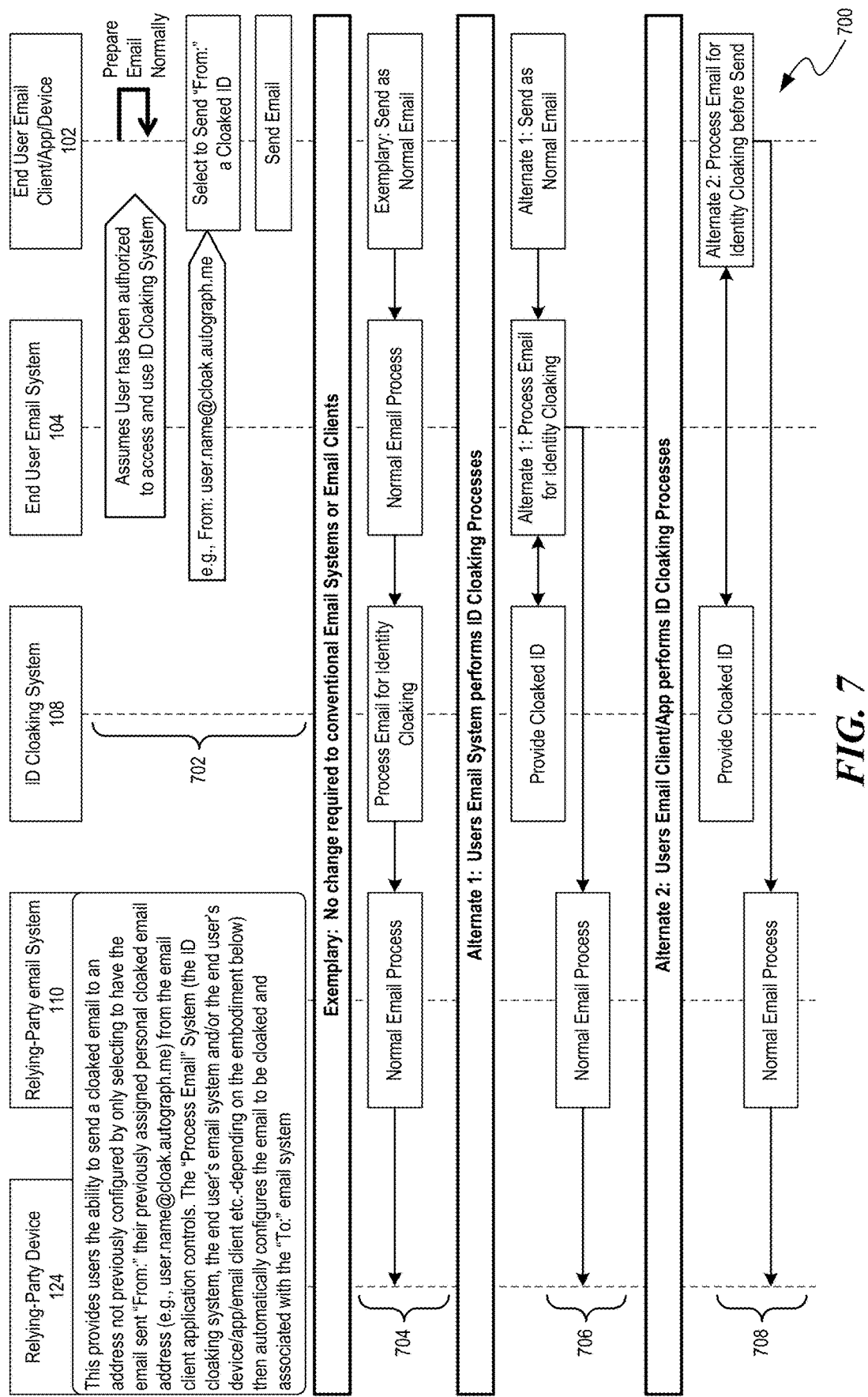
FIG. 7 illustrates an exemplary embodiment of creation of cloaked ID flow for when sending a first email to a receiving party.

End User Email Initiated Embodiment: Creation of Cloaked Identity Flow for: When Sending First Email to Receiving Party FIG. 7 illustrates 700 which feature tools and implementations for the end user email initiated embodiment discussed above. As introduced above, the end user has an option to initiate the disclosed tools by sending an initial email to the ID cloaking system. Once the ID cloaking system is associated to the first end user initiated email, communication between the end user and relying party may use the ID cloaking system as the intermediary.

FIG. 7 assumes, like in FIG. 5, that an end user account has previously been established on the Identity Cloaking System and properly configured. These embodiments provide end users with the ability to send a cloaked email to a relying party address not previously configured or designated as a relying party email address by the end user. This is via the end user simply selecting to have the email sent "From:" a previously created personal cloaked email address (e.g., user.name@cloak.autograph.me) from the end user email client/app/device. For example, the end user may select the address user.name@cloak.autograph.me in the "from" address field in an email client. This is configured in the email that the end user sends in 702. For clarity, this first email user.name@cloak.autograph.me may be designated as an ID cloaking system registration email.

user.name@cloak.autograph.me may have been previously created and usually assigned by the ID cloaking system 108. This initial end user email address serves to associate cloaked emails, cloaked email addresses to the user's account, profile and privacy settings on the ID cloaking system. In one embodiment, this email address could feature confidential end user information such as brian@cloak.autograph.me. As such, as discussed below this cloaking registration email may be replaced with a cloaked email which features no end user confidential information later on. Any associations can be made to this information such as the user's profile information etc.

In addition, selecting the cloaking registration email address and sending an email from this address triggers the involvement of the intermediary ID cloaking system 108 or other systems (depending on the embodiment) to start replacing/swapping/augmenting email address information so that emails the relying party receives in the same email chain do not have the end user's confidential information (e.g., his email address, name etc.) This is accomplished because the selection of sending an email from the registration email address immediately involves the intermediary or other steps as discussed below as the end user email is first routed to the intermediary before delivery to the relying party in which the intermediary is configured to execute the disclosed steps.

This cloaking system registration address is associated to the ID cloaking system. More specifically, sending this email to this cloaking system registration address triggers the involvement of the ID cloaking system intermediary which associates the email sent in 702 to her profile on the ID cloaking system as well as to emails sent between the end user and relying party.

The email sent in 702, optionally includes an end user written email message/attachment with optional end user confidential information. The end user addresses the email to the relying party address as she ultimately wants to send the information above and engage in future correspondence while protecting her information. This relying party address is selected/designated in the email as the "send to" address.

702 through an email client, the end user may configure their email client just as she would a new email account. This may comprise the use of standard email protocols like SMTP. Settings may be provided by the ID cloaking system so that for the outgoing mail, the email client application will send the email through the ID cloaking system gateway. For instance, if the end user had first real email address in the domain of gmail.com configured within the email client before adding a configuration, the end user's email client would have two accounts afterwards: one at @gmail.com and a second account would be added to the email client for an email in the domain of @cloak.autograph.me etc.

Thus, email using the 'From' the address (user.name@cloak.autograph.me) is associated with the ID cloaking system (e.g., via the ID cloaking system's domain) and sends the email to the ID Cloaking System to complete cloaking and routing processing before sending it to the relying parties email system (by one of three embodiments: 704, 706 or 708). In some embodiments, the cloaked emails and the ID cloaking system 108 have the same domain (e.g., autograph.me). This similarity ensures that the cloaked email addresses will be delivered to the ID cloaking system for processing and confidentiality.

FIG. 7 also assumes the end user is authorized to access and use the ID cloaking system. From here, 704, 706 and 708 discuss three different embodiments.

In the embodiment of 704, the end user email system 104 receives the above and forwards the email to the ID cloaking system 108. When the ID cloaking system receives the email, it is configured to associate the ID cloaking system registration email address (the email address designated by the end user as the "from" email address at 702) with the end user's profile and recognize that the end user intends to send a message to the relying party at the "to" address as entered in 702. In other words, given the end user sent the email using the ID cloaking system registration email address associated to her account (as the "from" email address), the embodiment now will use the ID cloaking system as an intermediary. This is because the email sent in 702 routed the email to the "from" address e.g., autograph.me, in which this intermediary at this domain is configured with the disclosed tools. This routing is done at end user email system 104.

In response to associating the above email to the end user's account, the ID cloaking system determines the end user's previously specified privacy preferences. The ID cloaking system then applies said privacy preferences to the email that is sent to the relying party email system 110. The ID cloaking system may also switch email addresses to maintain end user privacy. Specifically, the ID cloaking system will now send email to the relying party email address with a reply to address of cloak3@auto-graph.me or any other cloaked address that will first route any reply from the relying party first to the ID cloaking system 108. In addition, since the "from" address in the email sent at 702 had end user private information e.g., brian@autograph.me, this address is stripped from the email sent to the relying party email system. As such, Cloaked3@autog-graph.com may be also associated to the email chain, such as the various email addresses involved.

Typically, the reply to address will have the same domain as the ID cloaking system 108 and also like the original "from" address be associated to the end user's account/profile. The ID cloaking system 108 may also forward in this email and/or end user message/attachment. Said attachment may be screened for confidential information the end user had previously designated as such (e.g., during ID cloaking system account creation) and swap it out with anonymous placeholders like in FIG. 4.

Thus, the relying party receives the above email from the ID cloaking system, with no confidential information or with whatever confidential information the end user previously specified in her profile configuration. Also, email chain threading is preserved as when the replying party replies to the email above, as it will be first routed to the ID cloaking system 108 and will follow steps similar to FIG. 4.

In the embodiment of 706, an email is sent like in the embodiment above at 702, e.g., sent to use.name@cloak.autograph.me; however, the end user email system 104 is configured to do some of the tasks of the 704 embodiment above that were done by ID cloaking system 108. Specifically, the end user email system 104 instead of the ID cloaking system 108 may be configured to recognize that the user.name@cloak.autograph.me email address is associated to the user once the email arrives at end user email system 104.

Once the end user email system 104 recognizes that the email sent in 702 was "from" user.name@cloak.autograph.me (which was previously registered/associated to the end user) and address to info@norstroms.com, the end user email system 104 fetches a cloaked ID from the ID cloaking system 108 such as cloak3@autograph.com.me. Then the end user email system 104 swaps out any confidential end user information (as per her previous configurations in his account) and sends an email with a "to:" address as info@norstroms.com with the from address of cloak3@autograph.me. The end user previous configuration may be stored on the end user email system 104 or the ID cloaking system or other system.

cloak3@autograph.me may be associated to the email chain and end user information by the end user email system and/or the ID cloaking system. This address will function in a similar manner as that of the cloak1@auto-graph.com email address in FIG. 4. Specifically, it is an anonymous email address that the relying party will use in place of the user's real email address or ID cloaking system registration email. The end user email system 104 will then scan and replace any confidential information found in the end user's email sent in 702. The email is then sent to the relying party email system 110 so the relying party can read it.

In the embodiment of 708, the email drafted in 702 is processed and sent by the end user email client/app/device 102 itself as opposed to the end user email system 104. The email in 702 is recognized as from user.name@cloak.autograph.me by the end user email client/app/device 102 and also as address to info@norstroms.com. As such, the end user email client 102 communicates with the ID cloaking system 108, associates the "from user.name@cloak.autograph.me" address with the end user account, generates and associates a new cloaked email address": cloak3@autograph.me and may retrieve the end user's privacy preferences if not stored on the device itself. Like above, confidential information in the end user's email in 702 is replaced as per the end user's previous settings, the emails to: address is written as info@nordstroms and the from address is updated at cloak3@autograph.me instead of user.name@cloak.autogrph.me. The end user email client/app/device 102 sends the email directly to the relying party email system 110 without the aid of the end user email system 104. The above information may all be associated together and stored and later retrieved on any of the systems as desired.

Figure 8:
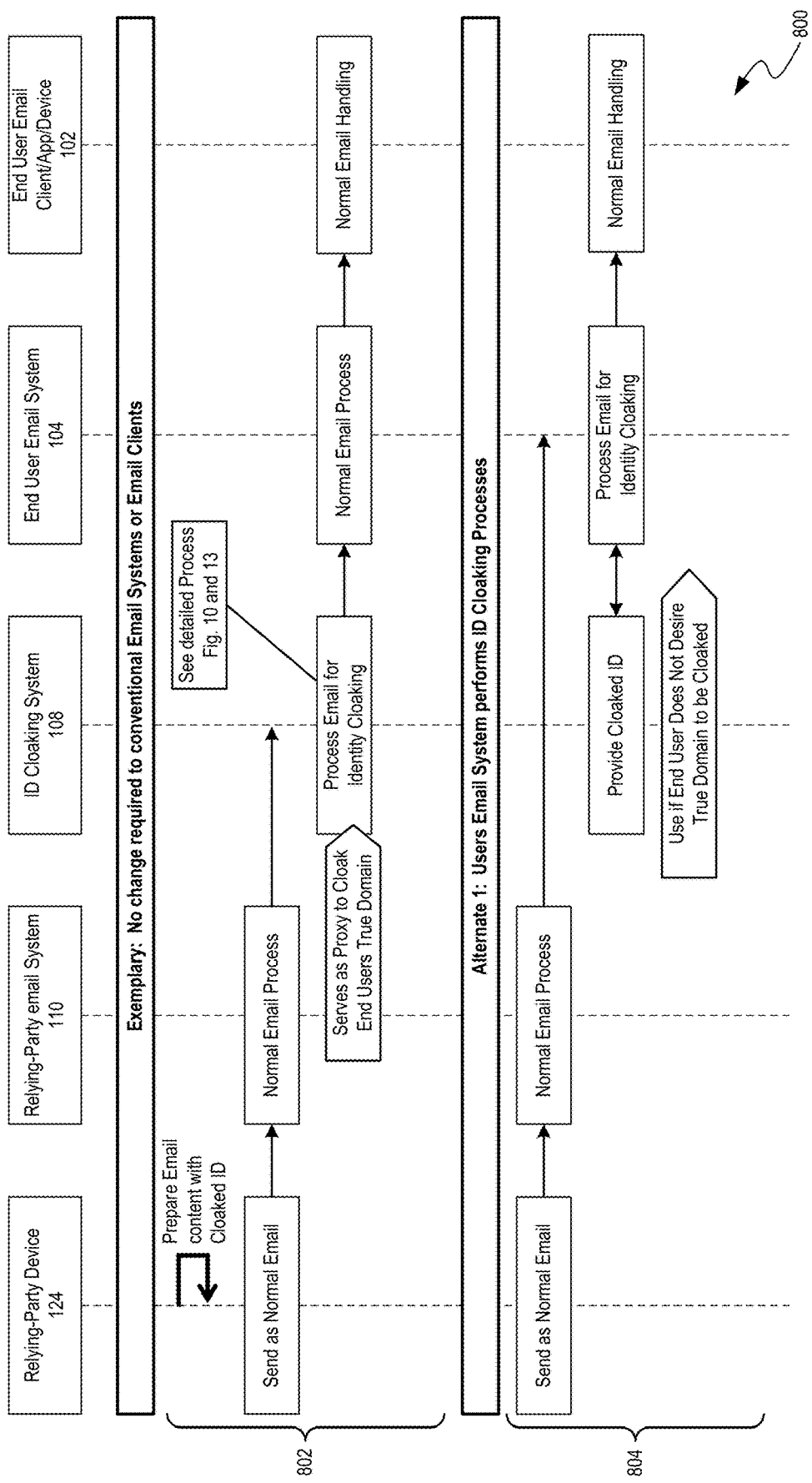
FIG. 8 illustrates an exemplary embodiment of a use of cloaked ID service flow for email from a relying party to an end user with a cloaked ID.

Use of Cloaked Identity Service Flow for Email From Relying Party to End User With Cloaked Identity FIG. 8 illustrates 800, which are tools to allow decloaking of end user information. Specifically, FIG. 8 discusses the relying party sending emails back to the end user which in the process pertains to cloaked emails from the relying party are decloaked by inserting confidential information and delivered to the end user.

There are two embodiments illustrated: 802 and 804. In both embodiments, the relying party typically has the end user's cloaked email address cloak1@auto-graph.com or cloak3@autograph.me and any cloaked placeholder information in place of confidential information any email message/attachments meant for delivery to the end user. The relying party may send emails for delivery to the end user's real email address without even having the end user's real email address with these disclosed tools.

In 802, the relying party composes the email to the end user with the "to" address as cloak1@auto-graph.com or cloak3@autograph.me and "from" address as info@Nordsroms.com at the relying party email device 124. This email is routed to the relying party email system 110. The decloaking process and delivery to the real end user address is triggered by the relying party simply sending the email to the "to" address. This is because the ID cloaking system is configured to associate the end user and her preferences to the received email upon email arrival. Arrival at the ID cloaking system 108 is by operation of simply sending the email to the ID cloaking system 108 whose domain in this embodiment has the same domain as the email address: autograph.me.

The ID cloaking system 108 is configured to associate the ID cloaking system registration email address to the user's real address and other information/confidential information (e.g., any email address associated to the end user's profile) as per the end user's previous configurations. Associations may be to the user profile, emails in within the email chain, end user cloaked email address(es), contacts, friends & family names and related information, home addresses, work addresses, telephone numbers, communication handles (twitter, WhatsApp handle), facial ID related information, location information, personal profile of preferred interests, brands, demographics etc. The ID cloaking system also recognizes placeholders the relying party inserted in the email for confidential information. The ID cloaking system 108 replaces the placeholders with the confidential information and sends the email with the real end user's email address and a "from"/reply-to address of info@nordstroms.com <cloak2@autograph.me> in a manner similar to that of FIG. 4 in order to keep email chaining intact. The email is then sent to the end user email system 104 so that end user can read it.

Like in 802, in 804, the relying party composes the email to the end user with the "to" address as cloak1 or cloak3@autograph.me (using the domain of the end user email system itself) and "from" address as info@Nordstroms.com as the relying party email. In this embodiment, simply sending the email back to an address associated to the same domain as the ID cloaking system 108 will route the email to it for decloaking. Here, ID cloaking system 108 is in communication with end user email system 104. Unlike in 802, in 804 the end user email system 104 does some tasks the ID cloaking system 108 did in the 802 embodiment. Specifically, the end user email system 104 is configured to recognize the cloaked end user address cloak1@auto-graph.com or other cloaked address such cloak1@gmail.com as well as the email to the user's account, account settings and confidential information and then replace any placeholders in the email with confidential information. The end user email system may ask the ID cloaking system 108 for the above associations such which real end user email address is associated to cloak1@auto-graph.com or other cloaked address. Also 108 will be able to process a cloaked ID if the cloaking id system is integrated into it (as part of gmail or other server.)

The email is then sent to the end user's real email address by end user email system 104, with the "from"/reply-to address of info@nordstroms.com <cloak2@autograph.me> in a manner similar to that of FIG. 4.

Embodiments Section

Webform Initiated Cloaking Embodiment

Figure 10:
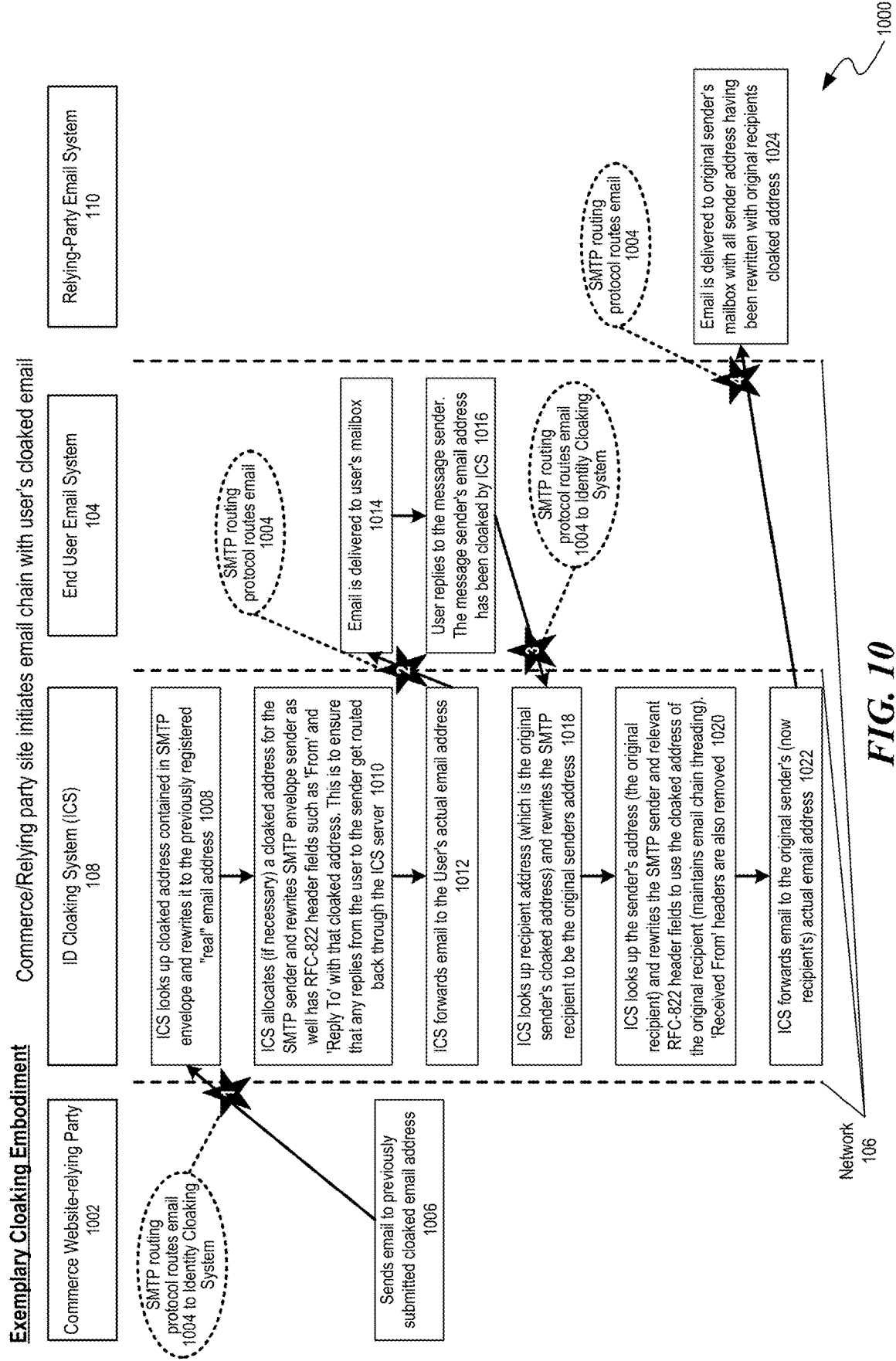
FIG. 10 illustrates an exemplary embodiment of a commerce site initiating an email chain with an end user's ephemeral/cloaked email.

1000 in FIG. 10 illustrates tools for the relying party/commerce website to send emails to the end user like in previous figures. FIG. 10 further illustrates exemplary technical implementations that are interoperable with all the disclosed tools.

1004 SMTP routing is featured as occurring over a network such as network 106 (e.g., the Internet). This helps route data between the illustrated systems (see also FIG. 1) commerce website relying party 1002, ID cloaking system (ICS) 108, end user email system 104 and replying party email system 110.

This figure assumes that the end user previously filled out a webform, form of a mobile app, or sent an initial email to the relying party with a cloaked ID as discussed in embodiments above. This also assumes that a cloaked email address is associated to her real email address with the aid of the ID cloaking system 108 (ICS) or other system as discussed above is also associated.

At 1006, the commerce website/relying party composes and sends an email addressed to the cloaked ID previously collected from the end user. In addition, the email may include placeholders for her confidential information e.g., a last name place holder etc. It is sent at step 1.

Steps 1008-1016 further illustrate the embodiment. At 1008, the email is received at ID cloaking system (ICS) 108 where it looks up the cloaked address contained in the email's STMP envelop and rewrites it to the previously registered "real" email address. Here, the real address may be determined by the previous association between the cloaked email address, the user's profile on the ICS and the end user's specified email address and any other desired information.

At 1010, the ICS may allocate a cloaked address for the SMTP sender and rewrites the SMTP sender envelope as well as the RFC-822 header fields such as "from" and "reply to" with the cloaked address. This ensures that any replies from the end user to the sender get routed back through the ICS.

At 1012, the ICS forwards the email to the end user's real email address as determined by examining the end user's profile as described above. This forwarding occurs at step 2 via 1004.

At the end user email system 104, the email is delivered to the end user's email box 1014. At 1016, the user replies to the email. This happens at step 3 in which the email is sent back to the ICS.

At 1018, the ICS looks up the recipient address (e.g., the original sender's cloaked address) and rewrites the SMTP recipient to be the original sender's address. At 1020, the ICS looks up the sender's address (the original recipient) and rewrites the SMTP sender and relevant RFC-822 header fields to user the cloaked address of the of the original recipient to maintain email chain threading. Also "received from" headers may be removed. Then at 1022, the ICS may forward the email to the original sender's (no recipient's) actual email address.

At step 4, 1024 the email is delivered to the original sender's email box with the sender address being rewritten with the original recipient's cloaked address.

End User ID Cloaking Server/System Account/Profile Configuration

Figure 11:
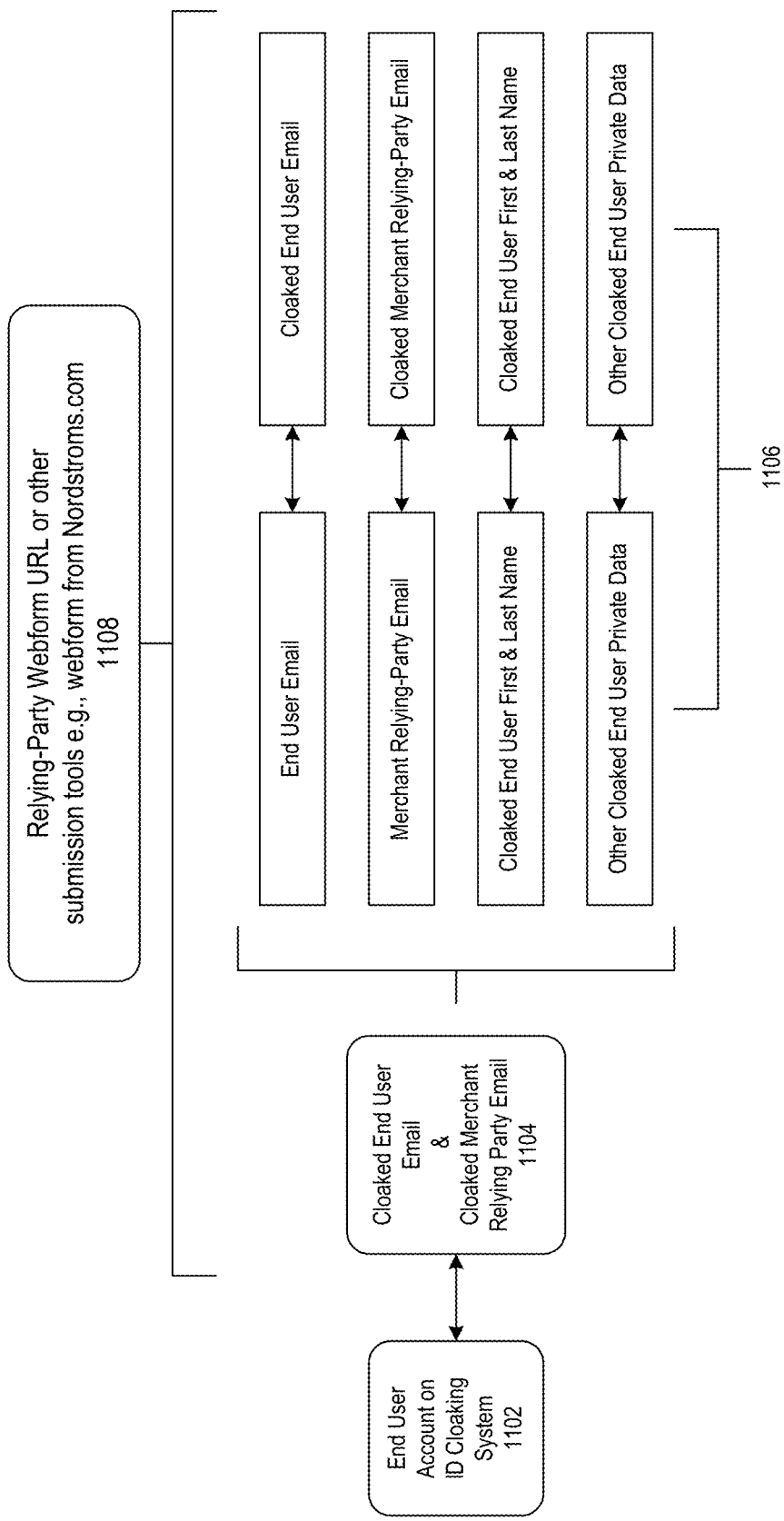
FIG. 11 illustrates an exemplary embodiment of an end user ID cloaking server/system account/profile configuration.

FIG. 11 illustrates 1100 which is an exemplary configuration of an end user's profile on the ID cloaking system 108 or other system. Specifically, the end user may submit various pieces of information which may include confidential information such as her real name, email address etc. This may be though direct communication between the end user and ID cloaking system such communicating it to servers at auto-graph.com etc. via her end user device.

As illustrated in previous embodiments such as FIG. 4, the end user profile/account 1102 may store the relationships between particular types of cloaked information such as a cloaked email or cloaked end user last name and to the real/confidential values such as brian@gmail.com and Roundtree respectively. Information and relationships/associations in a user profile can be used to communicate with multiple relying-parties. For example, a first cloaked email address can be associated with online retailers and a second cloaked email address can be associated with survey websites. In other embodiments, each cloaked email address can be associated with a one or more relying-parties. Also stored maybe the association between this information (see 1106 for examples) and a particular webform URL (1108) where the relying party gathered the cloaked information from and/or a relying party email address and/or the end user email address (e.g., 1104) or other data as well as end user permissions/settings/preferences. These relationships enable the ID cloaking system to resolve information so confidential email communications between the end user and relying party can occur as previously discussed.

In one embodiment, the above relationships can help protect end user privacy. For instance, if the end user notices that a cloaked email address she created with one merchant (related to the merchant email/URL when created etc.) is being misused, she can cancel, disable or delete the cloaked email address. The user can continue to use cloaked email addresses to communicate with other relying-parties.

Creating End User Identities in a Webform Embodiment

Figure 12:
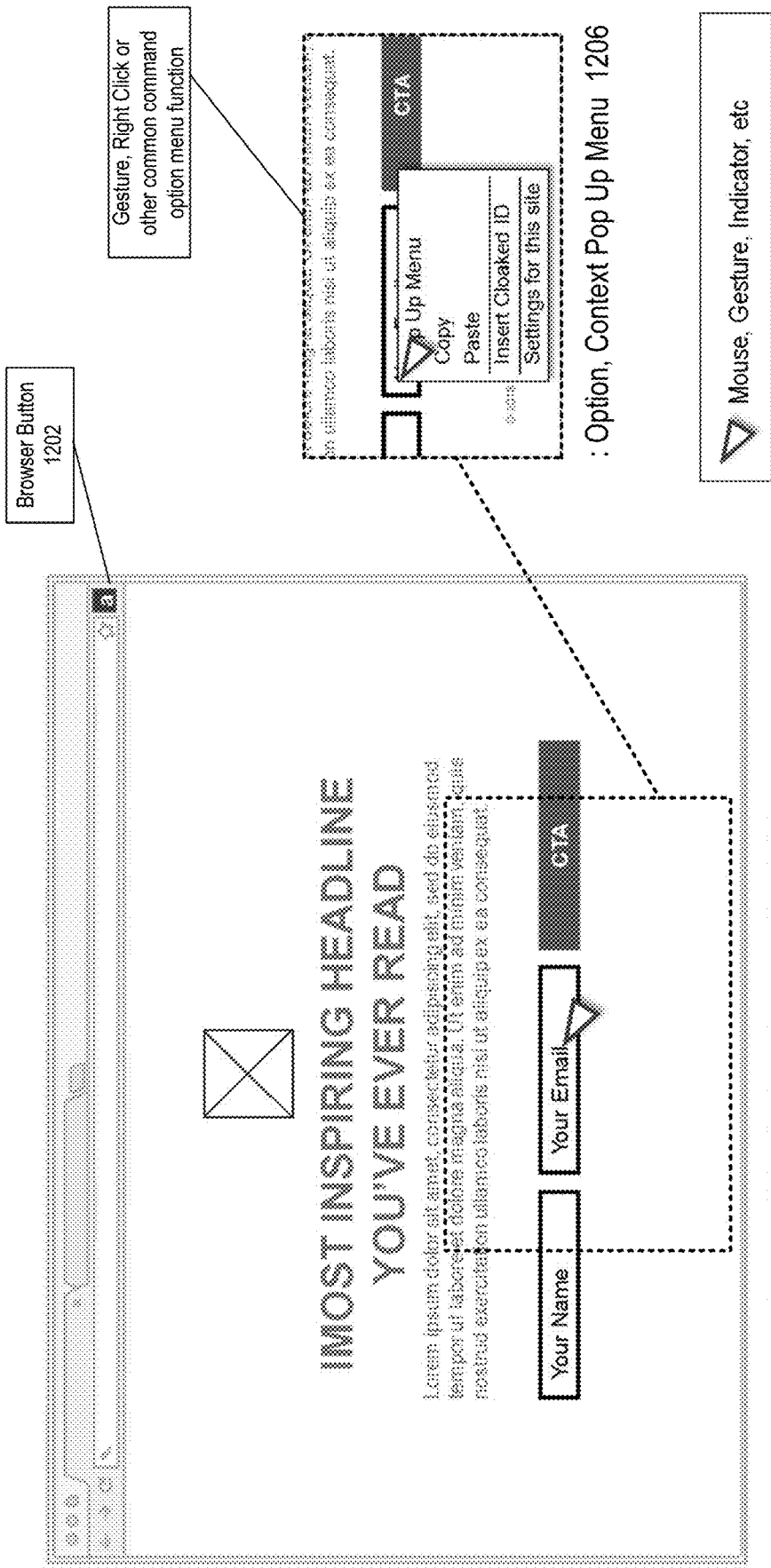
FIG. 12 illustrates an exemplary embodiment of an end user using a webform.

FIG. 12 illustrates an embodiment in which an end user can easily and quickly create an end user ID on a webform when displayed on the end user device 102. Here, when a user goes to a URL such as nordstroms.com, a webform such as 1204 may be displayed as well as a browser button 1202.

Given the end user may be logged in or otherwise in communication with the ID cloaking system 108 when filling out form 1204, the ID cloaking system can easily generate a cloaked ID and send it to the end user device 102 so she can fill it in the webform.

This may occur when the end user clicks or gestures on or near a field such as "your email" field. The document object model of the displayed webform is analyzed by the ID cloaking system 108 and it is determined a cloaked email is needed. In further response to the click, the end user device and ID cloaking system 108 may display the pop up menu 1206. Here, the menu displayed various options including the option to insert a cloaked ID, replace a cloaked ID that was filled in the field with the end user's confidential information. The end user can select this option and a cloaked ID generated by the ID cloaking system or even the end user device is inserted to be sent to the relying party.

The URL the webform was at, the user's profile, the user's real email address, and the cloaked ID email address and any other data may be associated together as a result of these tools on the ID cloaking system 108 or other systems.

Creation of Cloaked Identity Flow for: When Establishing New ID in a Web Form

Figure 13:
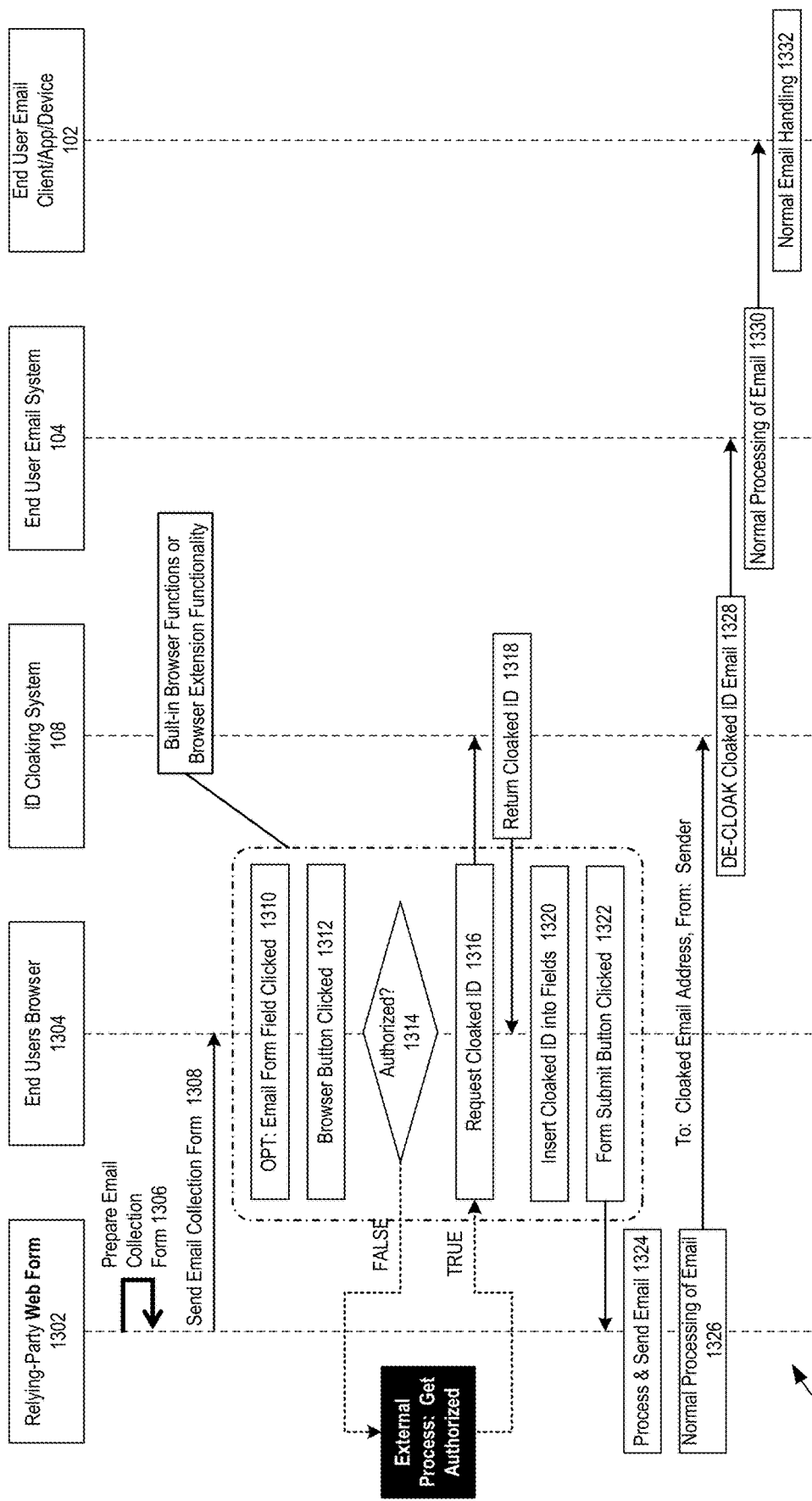
FIG. 13 illustrates an exemplary embodiment of cloaked ID flow when establishing a new ID in a webform.

FIG. 13 illustrates 1300 which are tools to create a cloaked end user ID in a webform as also illustrated in FIG. 12. This figure features the interaction of a relying party web form 1302, end user's browser 1304, ID cloaking system (ICS) 108, end users email system 104, and the end user email client 102.

At 1306, the relying party may create the email collection web form 1306 and send it to the end user's browser at 1308 where she fills it out. The end user's browser is configured or has a browser extension configured to execute these steps and maybe associated with a previously created end user profile as discussed above.

The end user may click on an email form field in the webform at 1310 or click on a browser button at 1312 to determine if there is authorization 1314 for the end user to create a preexisting cloaked ID or to check to see if one is already existing for the end user for the particular webform at the URL etc. This may be determined by examining the end user profile, the webform field, the webform URL and any associated information between these.

This may be done at 1312. If no cloaked ID is found/not authorized then the webform page URL may be sent to the ID cloaking system and a cloaked ID is returned to the end user's browser at 1318. The returned cloaked ID is inserted into the webform field at 1320 and the end user clicks the webform submission button at 1322. It is then transmitted to the relying party's server and processed at 1324. Also at 1324, an email is sent from the relying party to the end user using the cloaked ID which is done normally at 1326.

The cloaked email address typically has a domain associated to the ID cloaking system 108 and when the relying party sends the email it is routed to the cloaking system to be decloaked at 1328. Here, the cloaked address, which was previously associated with the relying party URL, webform field, end user profile etc. is recognized as being sent by the particular relying party, and sent to the end user. The cloaking system may replace the cloaked ID email address with the end user's real email address and send to the end user at 1330 and 1332.

The interaction discussed in connection with FIG. 13 can also be used to create a cloaked identity using a mobile application or other software. In some embodiments, the user's email program or system can let the user select whether to generate a cloaked identity. For example, the user can select a cloaking button and the email program or system can then automatically provide information to the ID cloaking system to create a cloaked identify for that email. In some embodiments, the ID cloaking system can be part of the end user email system or end user application.

Auto Cloaking Confidential Information in the Background Embodiment

One embodiment of the above is configured with tools that automatically monitor end user inputs for confidential information (e.g., in real time). Upon detection, the confidential information can be automatically cloaked (e.g., replaced with a placeholder). Here, the placeholder information can be communicated to the relying party instead of the confidential information.

For instance, in one embodiment, after the end user created her cloaked ID system account/profile and defined which of her information is confidential, the tools on her device such as a browser plug-in, iOS application, any other application, operating system (or remote tools) can be configured to continually monitor the end user inputs on her device such as inputs via keyboard or voice or camera inputs for confidential information associated to her profile. In one instance, browser plug-in, iOS application, any other application, operating system (or remote tools that are configured to indirectly or directly communicate information to other systems) are specifically monitored for confidential information. In one embodiment, this can be done by monitoring raw IP packets.

For instance, the disclosed tools (such as web browser plug-in extension) may monitor the document object model of the webpage that may include a webform the end user loads in her web browser. The tools may focus on the form entry fields which are designed for end user data entry. In one example, as an end user types in brian@gmail.com in a webform, the tools examine the form field the end user is typing in keystroke by keystroke. Here "brian@gmail" is recognized (sometimes even before he finishes typing the string) as user defined confidential information, then the string "brian@gmail" is swapped into memory (in case the user wants to still use it and not a placeholder) and replaces it (optionally automatically or a menu may ask the end user) with a new or existing cloaked place holder email address based upon the domain the webform is located at (e.g., by referencing the URL, end user account at the ID cloaking system 108 as discussed in other sections herein). The URL may be determined as new or previously associated to the end user profile as needed and a cloaked email address reused or can be newly created as desired by the end user. An example webform is illustrated in FIG. 14.

Figure 14:
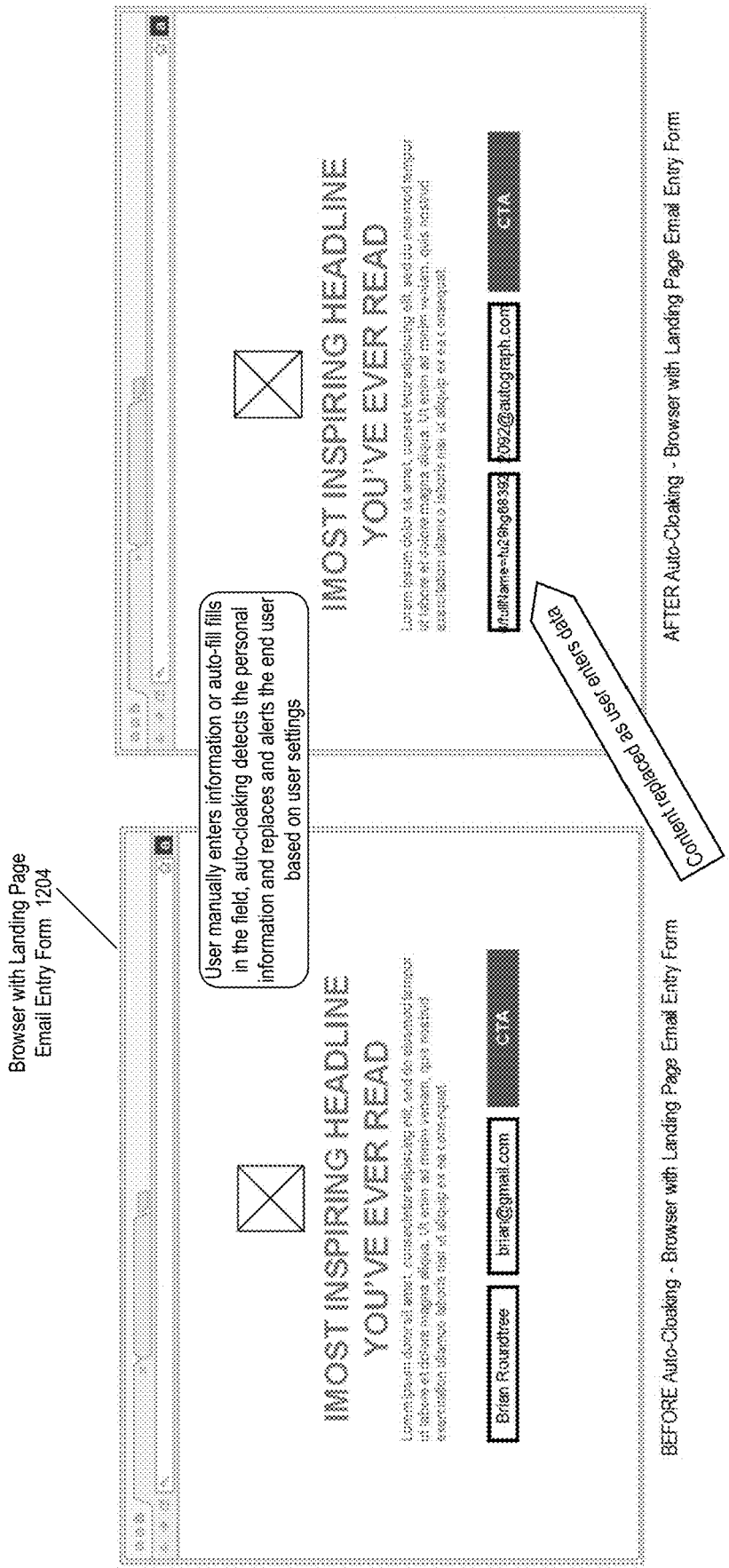
FIG. 14 illustrates an exemplary embodiment of another webform.

In one embodiment in FIG. 14, a local data store on the end user's device (synced between the central or P2P server and/or the ID cloaking system and local device) of confidential information is used to search for confidential information. This could be used across all applications that the end user may use if implemented at a lower OS level, or even at an IP level over the network via deep packet inspection. This could include any application that may communicate data out of the end user's device such as WhatsApp™, Signal™, Venmo™ or other application as desired etc.

In another embodiment, there may be some optional configurations to control how or if specific information is replaced based on the domain where information is being communicated or the author or type of application as well as with any end user preferences. For instance, a setting may be available for the end user to turn off replacement of confidential information in a banking website or banking iOS application etc.

When confidential information is detected, it may automatically be determined what type it is (such as via the keyword associated to the webform field), the end user account referenced to determine a placeholder and a note made on a URL that requested it (e.g., nordstroms.com), and the placeholder inserted in place of the confidential information according to the end user's desired account preferences. The replacement may also depend on the URL and any end user preferences toward that URL.

In one embodiment, when confidential information is detected, the disclosed tools may first display a warning to the end user and offer the end user the choice to replace the confidential information or not by displaying option buttons or other tools. This may also be an automatic mechanism without asking the end user. In another embodiment, after detection of confidential information input, as the end user finishes typing the input such as "brian.rou . . . " before the end user finishes typing the last letters of "brian.roundtree.", a notification/warning can be displayed to the end user with optionally the display of the placeholder and option of replacement. This may give the option for the end user to use the place holder or not. If the placeholder is used, optionally, sound, visual cues can be made to indicate such to the end user.

The following are some non-limiting examples of automatically detecting and cloaking text in an entry field and corresponding exemplary placeholders:
1) brian@gmail.com—cloaked with→002934hfu29hg32092@autograph.com
2) 999 N Northlake Way, Seattle, Wash. 98103—cloaked with→domain.tld/address=fu29hg32092
3) 800-555-1212—cloaked with→domain.tld/bizPhone=fu29292092
4) Brian Roundtree—cloaked with→domain.tld/fullName=fu29hg68392
5) Brian—cloaked with→domain.tld/fname=fu29hg32092
6) Roundtree—cloaked with→domain.tld/whatsapp_handle=fu29hg32092

The above tools may apply to both creation of new cloaked ID or the use of it: e.g., 1) PII is detected in a browser field for a new domain.tld—a new cloaked ID would be created; 2) the user is logging into a known domain.tld, and the user name field is automatically filled in, or the user can select from a drop down menu displayed in or around the form field.

For instance, in a web browser with the web browser plug-in discussed above, if the end user goes to a URL where she has never been before, and the end user wants to be on the URL's email list, she can easily subscribe with a cloaked ID. For instance, she can type in her actual email address in the URL's webform for email addresses and the extension recognizes that the email is her actual email (e.g., it is in communication with the cloaking ID system) and suggests a new cloaked replacement email.

Embodiment for Requesting a New Cloaked Email That is Substantially Easy to Communicate Verbally Cloaked information/placeholders can be configured as seen in the figures to be substantially long and randomized strings of text. However, in some cases such as when an end user needs to verbally communicate this string to a cashier or other employee of a relying party, it can be awkward, time consuming process to communicate each character individually.

Disclosed is an embodiment that uses placeholders that are comprised of words that may be found in dictionaries and optionally any other string such as a number(s) and optionally strings of randomized characters. In one embodiment, a place holder may be comprised of three words found in the dictionary (any dictionary of any language). Any number or combination of words, characters and numbers can be used. Thus, when a cashier at a merchant store verbally asks for a cloaked email or other piece of cloaked data, the end user can verbally a disclose a place holder that is less tedious to say than a long string of random letters and numbers. This would make it easier for the cashier to input as well.

For instance, the end user may use a smart phone application or any other tool to request a new cloaked email address. For example: if the user is at a merchant's store register and desires to sign-up for a loyalty program using a cloaked identity instead of disclosing her real email address, she can simply request a cloaked email address from an application.

Here, the user opens her ID cloaking application (optionally in communication with ID cloaking system 108) on her phone and taps a UI button for a new cloaked email address. Like for other embodiments above, it is assumed the end user has previously created a profile at the ID cloaking system 108 or other system, signed in, specified confidential information and associated preferences etc.

The application may contact the ID Cloaking system and request a new cloaked email address or other placeholder configured for substantially easy "verbal delivery." Verbal delivery format may be defined as a placeholder format that is substantially easy for a human to verbally communicate versus a large random alphanumeric string. Verbal delivery format may bring together substantially easy to say and spell words to make a new address that can be easily given to store personnel, easily written down or entered into a cashier terminal, or entered by the user into a kiosk or other entry device.

One such example of using a combination of words as opposed to randomized strings of characters are: broadway-jay-tree@cloaked.id. The next address might be john-hill-side-cat-8@cloaked.id. Once the address is generated, ID cloaking system 108 may compute and reserve the address for the end user, allocate it to the end user account for special processing upon receipt of first email using the address. The generated address may be associated to the end user profile, location she is at, end user preferences or other data.

The generated cloaked address is displayed or otherwise disclosed to the end user. The end user may then disclose the new address in a substantially easier manner than long randomized strings. The end user can optionally associate notes about who they provided the address to in the application or other notes as desired. This information may be forwarded to the end user in the next steps.

Upon the cloaking ID system 108 receiving the first email sent from a sender such as a relying party, several steps may occur: 1) the senders email domain is determined (using SMTP protocols and the 'From' address's domain) and associated with the cloaked end user address generated above and the end user's profile. SMTP may be used to send the email between servers, potentially using associated email protocols to confirm the sender and then access information in the email header and body which may be modified.

2) The ID cloaking system or other system may send the end user a new interactive HTML email directly to the end user's real email account that is associated with the profile (or alerted in the application). This email may request the end user to approve the receipt of emails from the cloaked ID by the relying party sender. For instance, this email may have a button that says "click here to approve that you want all emails with from Nordstrom's to be cloaked". This email may contain the "from" address and other information determined with SMTP protocols and the end user notes they may have made to themselves during issuance of the address which may have been associated to her profile and cloaked email address. 3) If approval is given by the end user, the address is enabled and identified as accepted in the ID cloaking system. 4) However, if rejected by the end user, the address is identified as such, and optionally disabled from future use (similar to 'inactivated by the user'.) In one embodiment, disabling can be done by deleting the email address or auto archiving emails. The user may reactivate if desired.

Upon end user acceptance, the ID cloaking system, forwards the original cloaked email to the user in a manner similar to other embodiments herein.

An alternative embodiment that may occur: upon receipt of the first email from a sender: the system records that first email has been received, and inactivates the account to receive/accept further emails. The end user is forwarded the original email sent by the relying party in which the ID cloaking system 108 added interactive HTML into its contents that informs the user that this is a new address they need to approve in order to continue to get emails from the relying party delivered here. There may also be a UI that requests the end user to approve: that the email may contain the "from" address of the relying party and other information determined with SMTP protocols and the notes they may have made to themselves during issuance of the address. If this is accepted by the end user, the cloaked email address is enabled and identified as end user accepted in the ID cloaking system. If enabled, then the domain is associated with the cloaked ID. If rejected by the end user, the cloaked address is identified as such, and permanently disabled from future use (similar to 'inactivated by the user'). The user may reactivate if desired.

Definition of Personal/Confidential/Private Information

In one embodiment, the definition of personal/confidential/private information can include: 1) All information considered PII (Personally Identifiable Information) by a various pieces of legislation: e.g., EU GDPR (the European Union General Data Protection Regulation, US-California CCPA, etc.; 2) Any information designated as such by an end user: e.g., WhatsApp chat handle or user-name; 3) Any information desired to be protected by an organization, such as an enterprise: e.g., an enterprise may instruct their employees' to use cloaked identifiers when communicating with certain types of marketing registrations for free PDFs etc.; and 4) any other desired information.

Product Integration Embodiments

Figure 15:
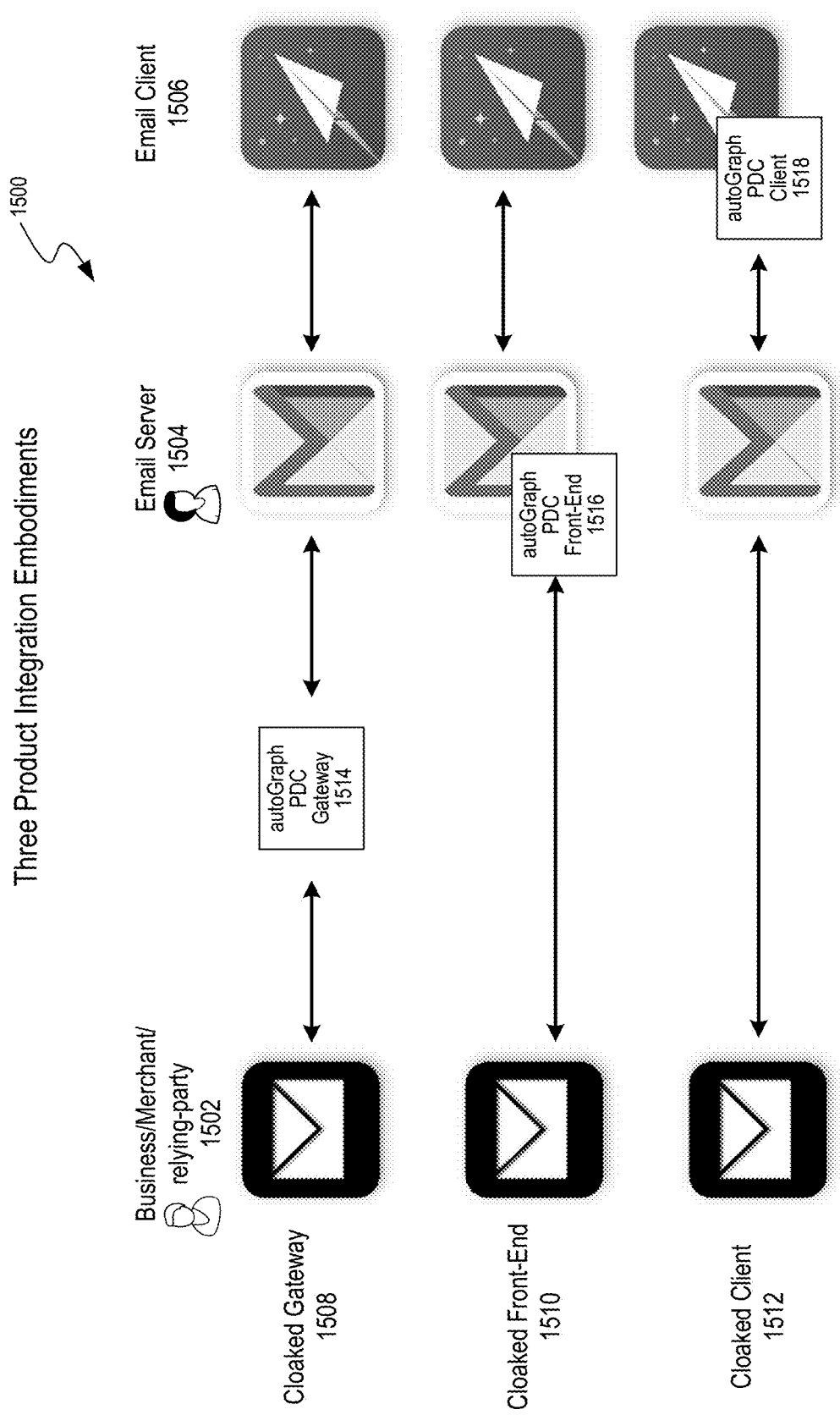
FIG. 15 illustrates an exemplary embodiment of three product integration embodiments.

FIG. 15 illustrates various product integration embodiments 1500 of the tools disclosed herein. Featured here are the relying party 1502, email server 1504, email client 1506, cloaked gateway 1508, cloaked front end 1510, cloaked client 1512, autograph PDC gateway 1514 (Personal data cloaking gateway), autograph PDC front end 1516 and autograph PDC client 1518.

As illustrated, the integration may be done in various ways to get the same or similar effects.

Cookie Cloaking Embodiment (Domain Containerized Browser Storage-DCBS)

Figure 16:
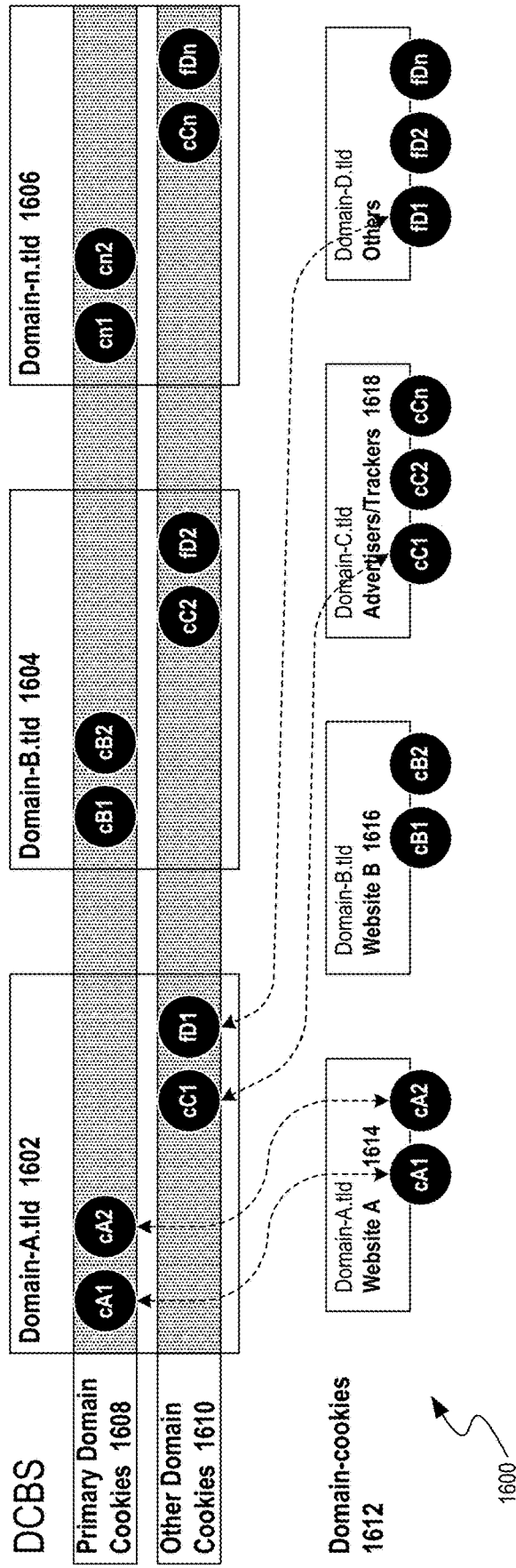
FIGS. 16-17 illustrate an exemplary embodiment of a "cooking cloaking" embodiment.
Figure 17:
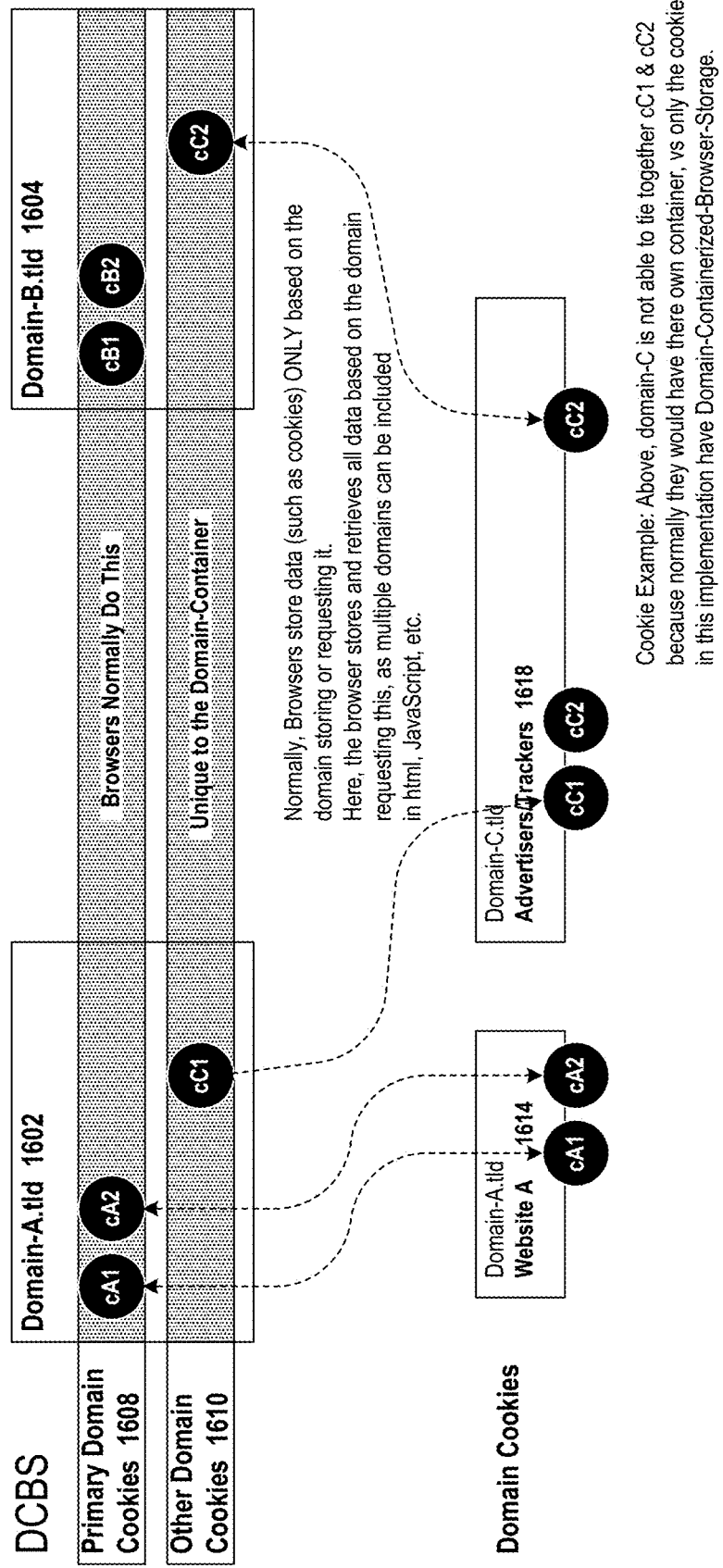

FIGS. 16-17 illustrate an embodiment of "cookie cloaking" 1600. Cookie Cloaking works by isolating an end user's cookies into a separate container(s) that makes it harder for unwanted tracking and advertising domains to track your visits to other websites with their cookies.

This may be by operation of a browser extension. Installing this extension may close the end user's existing browser tabs, delete the existing domain cookies, and log her out of Facebook (or other Single Sign in identities like Google, Amazon, etc.). The next time the end user navigates to a domain it will load in a new autoGraph blue colored browser tab creating a new cloaked-container) that could be for the domain that belongs to the website the end user goes to. The cookies within a container can be domain cookies 1612.

The end user can then log in and use Facebook normally when the container is being used to store cookies for that particular domain. If she clicks on a different link or navigate to a another website in the URL bar, these pages will load outside of the current container e.g., into another container for that particular domain. In one embodiment, only cookies allocated to a container owned by a specific domain owner can be retrieved by that particular domain owner. Thus, the boundary of the container is the domain associated to that owner.

In one embodiment, preventing end user cooking cross tracking may be accomplished by marking/designating/naming/allocating/storing cookies from primary domain owners as opposed to other domain owners to: 1) identify the owners of cookies as primary cookie domain owners or not; 2) achieve the effect of containerizing (isolating) cookies from primary or secondary domain owners that do not own a particular cookie or otherwise should not have access to cookies which prevents end user cookie cross site tracking. These steps can be executed by the end user's web browser or a browser extension.

In FIG. 16, a primary domain (1602) owner of a cookie (1608) is typically designated as the owner of the website 1614 the cookie is downloaded from on the end user's machine. For instance, when an end user's browser goes to Walmart.com and a cookie (such as cA1 or cA2 in FIG. 16) from that website is downloaded to her device-those cookies are marked as primary domain owner cookies. In a like manner this occurs for domain B 1604 and its website 1616 and other domains like 1606. Ownership can be defined as having accessibility to the cookie (a cookie owner can access the cookie, while a non-owner cannot access a cookie not belonging to her).

A secondary domain owner is typically designated as the owner of the cookie (1610) downloaded from a primary domain website at the request of the secondary domain except the secondary cookie owner's domain does not own (is not) the primary website domain. For instance, in the above example, another cookie is further downloaded via the Walmart webpage by the end user's browser. This second cookie (see cC1 in FIG. 16) is associated to a domain other than Walmart.com such as google.com. Here, the second cookie is marked as a secondary domain owner cookie as it was retrieved from the primary domain but is associated to a non-primary domain. Non primary domains are typically advertisers and trackers 1618. The secondary domain owner cookies may also be marked as being associated from the primary domain owner whose webpage they were downloaded from e.g., a secondary domain cookie downloaded from the Walmart.com webpage (which was the primary domain).

In one example when the user goes to a URL, that domain may be designated as the primary domain. The primary domain can be determined when the user goes to the primary website abc.com (e.g., she goes to this URL in her browser) in which the webpage's document object model reflects that abc.com is the primary domain. Primary domain cookies can also be determined by examining the document object model of the webpage. These cookies can be accessed by the primary domain. Secondary domain cookies and their owners can also be determined by examining the document object model. Then another cookie retrieved from the abc.com webpage might be accessible by bluekai.com with name value pairs of data within would be a secondary domain cookie. Another secondary cookie from the webpage abc.com might be from adobe.com and another might be from go.com.

Once the browser distinguishes the cookie primary and secondary owners of the cookies and other characteristics of the cookie, the browser can designate/mark/store/allocate the cookies appropriately. The browser maybe configured to limit access permissions to different cookie owners based upon the said cookie's markings etc. These permission settings as a result of ownership effectively containerizes/isolates the cookies by cookie ownership (primary vs secondary cookie domain owners). With this embodiment, advertisers/trackers (typically secondary domain owners) that previously only had restrictions on cookie access by less granular domain ownership (e.g., google had access to all cookies associated to the domain google across a plurality of primary domains on the end user's device) that did not distinguish between primary and secondary domain ownership can be restricted from accessing certain primary domain cookies.

In one embodiment, a restriction maybe to restrict cookie permission access by 1) primary domain ownership of a cookie; and 2) secondary domain ownership of a cookie in addition to which particular primary domain a cookie was originally downloaded from. The first restriction may allow a primary domain owner access to the cookie on the end user's device if the cookie was downloaded from the primary domain (e.g., Walmart.com). The second restriction may allow the secondary domain cookie owner to access a cookie on the end user's machine when the end user goes to the primary domain's website on the conditions that the cookie was marked as a secondary domain cookie (downloaded from the primary domain at the request of code on the primary domain web site on behalf of the secondary domain) when the cookie was first downloaded to the end user's device and the secondary domain correctly identified itself as the secondary domain. In one embodiment, the second restriction may result in: the end user visiting the primary domain website and the website code requesting the secondary cookie which allows the cookie to be transmitted to the secondary domain owner if that secondary cookie was originally downloaded from the particular primary domain.

In the event a there are multiple primary domains such as in FIG. 16 such as domain A 1602 and domain B 1604, and a common secondary domain owner such as domain C 1618 belonging to for example advertisers/trackers (e.g., google having secondary domain cookies on various primary domain websites), unlike at present, where the secondary domain can download a single large cookie with information about all the primary domain web sites (e.g., triggered when the end user visits only a single primary domain website), this invention permits the secondary domain owner to get her secondary domain cookie only when the end user visits a particular primary domain and the secondary cookie had to have been previously downloaded/created by the particular primary website and the website code requests the secondary cookie owner get access to the secondary cookie.

Thus, in this embodiment, a secondary domain cookie owner with multiple secondary domain cookies associated to several primary domain cookies on the end user's device, might have at least one secondary domain cookie for each primary domain such as cC1 and cC2 in FIG. 16 and FIG. 17. In addition, the secondary cookies may not contain information pertaining to the primary domain it is are not associated to. As a summary, the secondary cookie owner may only be able to download the secondary domain cookie upon the end user visiting a first primary domain that the secondary domain cookie was originally downloaded/created from and not other primary domains that may have a secondary domain cookie from the same secondary owner but whose secondary domain cookie was not downloaded/created at the first primary domain.

In one embodiment, during browser extension installation to enable the above, the installation should ensure that all cookie URLs, pixel URLs exist only once across all containers and delete any duplicate cookies, pixels, etc. from the end user's other containers on install and when you restart the browser, to clean up any potential trackers.

The browser extensions need not store anything on any server or other device, only in the browser on the local device where it is configured. In other embodiments, cross device syncing of settings and data possible. Either browser to browser syncing so the server doesn't store anything or encryption can be used for stored information Cookie-Cloaking may leverage the Containers feature that is already built in to the Firefox™ browser. When one enables Cookie-Cloaking, the end user may also see Containers named Personal, Work, Shopping, and Banking while you browse.

In one embodiment, clicking Facebook Share or other share buttons on other browser tabs can load them within the Facebook container.

Purchase Flow With ID Cloaking Embodiment

Figure 18:
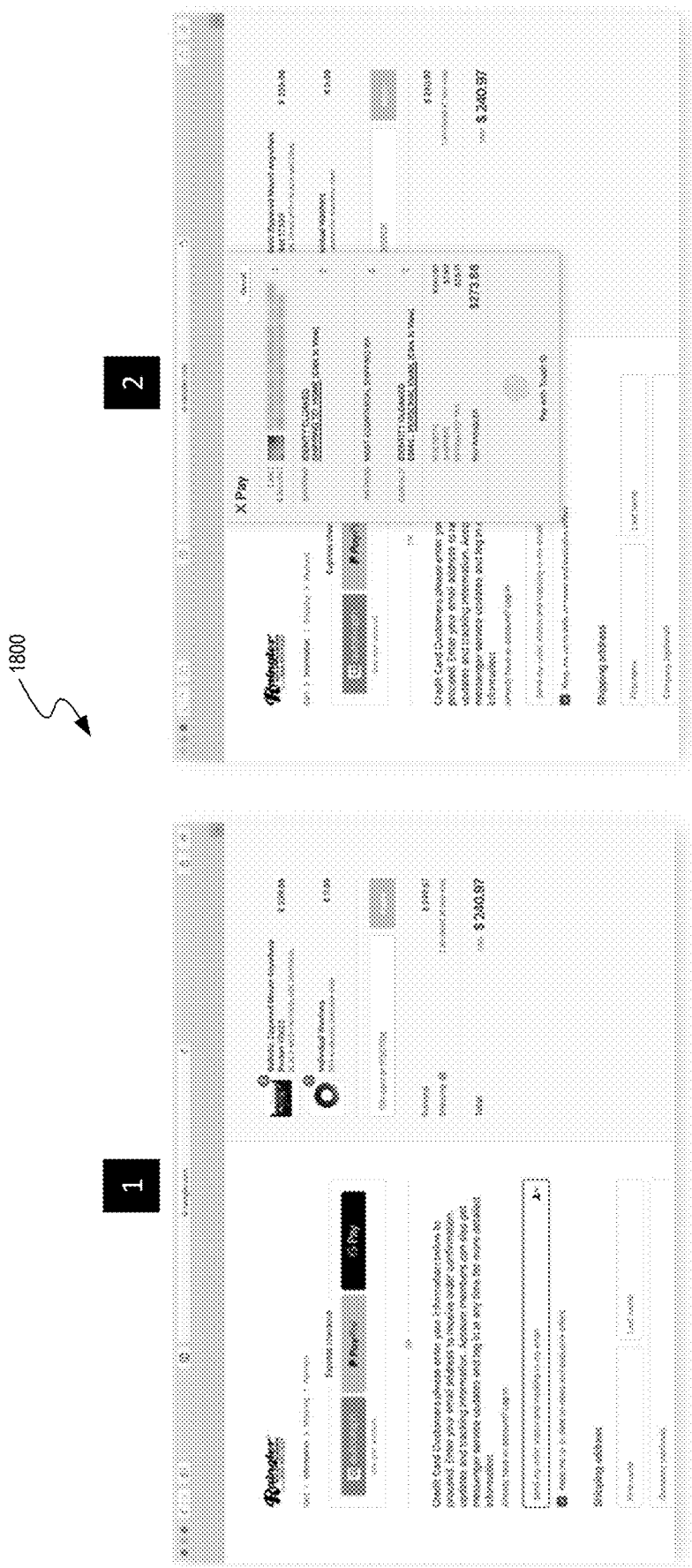
FIGS. 18-18A illustrate an exemplary embodiment of a purchase flow with ID cloaking.
Figure 18A:
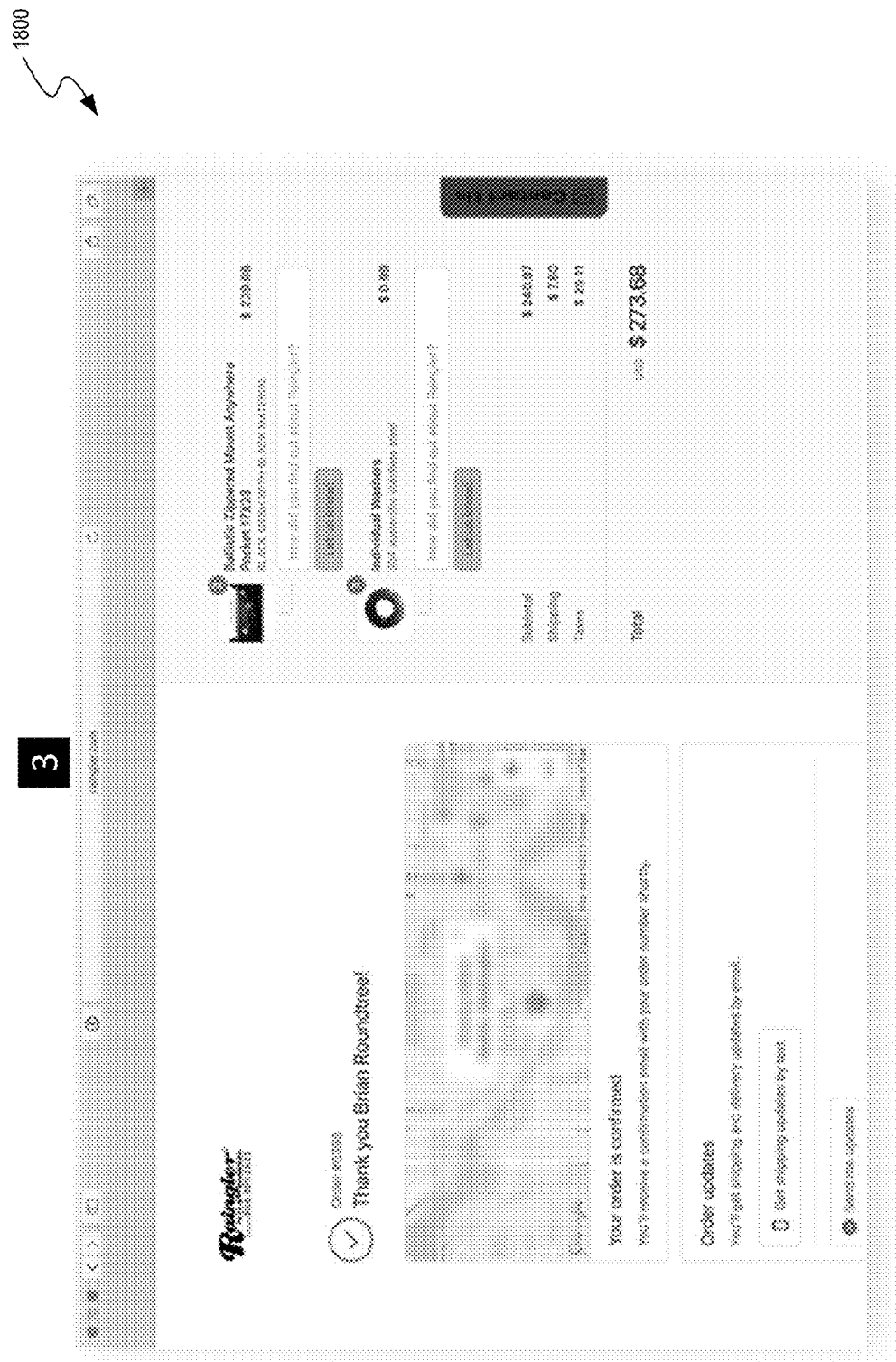

FIGS. 18 and 18A illustrate an embodiment of a purchase flow with ID cloaking 1800. As illustrated, using the autoGraph linked sign-in allows identity cloaking to be automatically linked into the payment and shipping information, cloaking all personal information effortlessly. This maybe done through associating this information as well as the relying party webform field, URL etc. together via the end user's profile.

THE DISCLOSED TOOLS AND EMBODIMENTS HEREIN CAN BE USED WITH EACH OTHER IN ANY COMBINATION.

Description of Computer Hardware

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Figure 19:
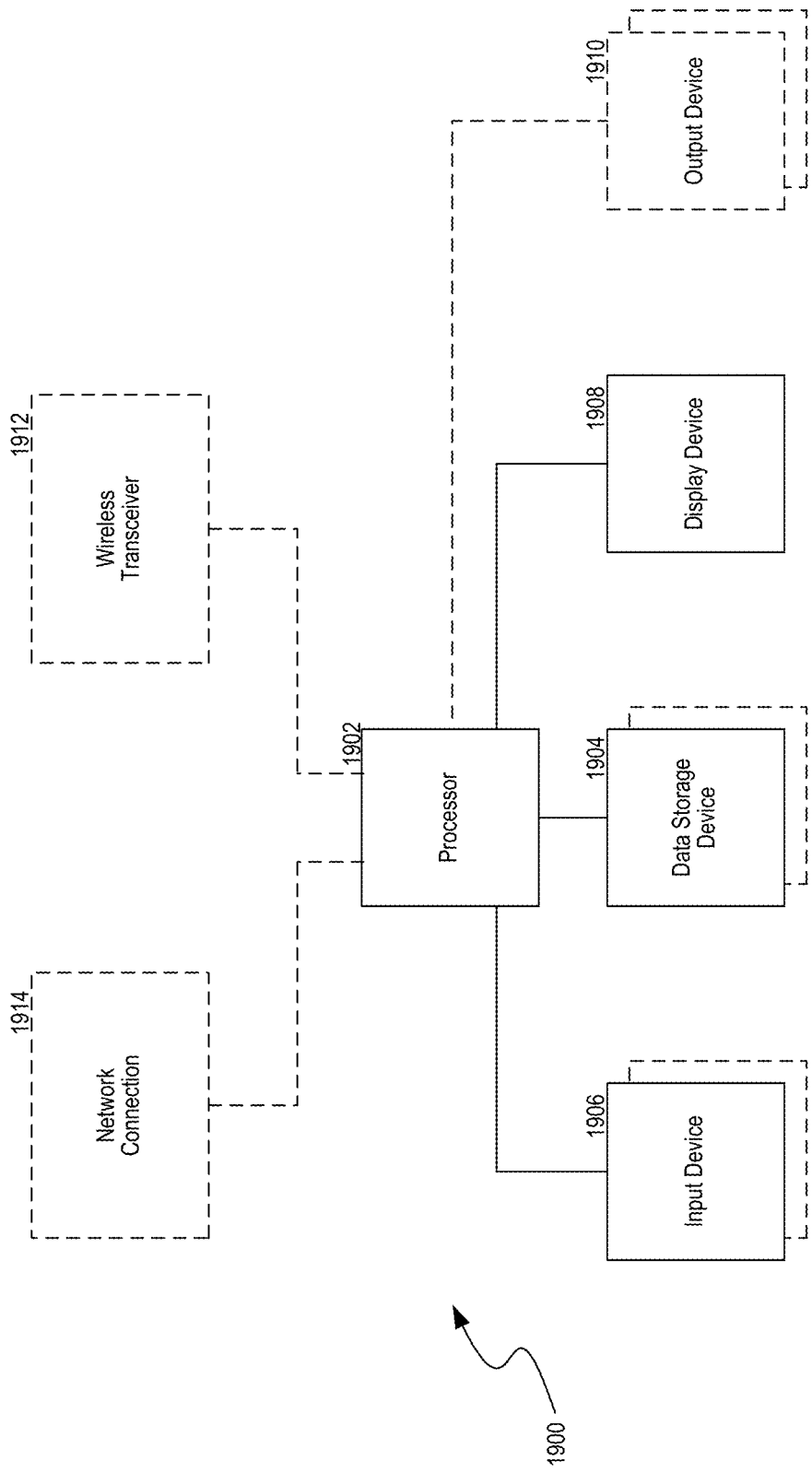
FIG. 19 illustrates a block diagram of a user's computing device in accordance with an embodiment of the disclosed technology.

A non-transitory, computer storage medium/media can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing device using data stored on one or more computer-readable storage devices or received from other sources. For example, the non-transitory, computer storage medium can be a computer readable medium that stores contents including one or more computer programs, contents that are executable by processor electronics, etc. A representative data processing device is shown in FIG. 19.

The data processing device includes "processor electronics" that encompasses all kinds of apparatus, devices, and machines for processing data, including by way of example a programmable microprocessor 1902, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

In some embodiments, the processor electronics can be configured to execute instructions stored in memory to perform cloaking. For example, a processor-based ID cloaking system (e.g., ID cloaking system 108) can include processor electronics that operate to receive an email addressed to a cloaked end user address and identify an end user specified address as well as any URLs associated to the cloaked end user address based on an end user profile. The processor electronics can determine whether the end user profile contains a previous association between a third-party email address (e.g., relying party email address or another party's email address) and a cloaked relying party email address. The third-party email address can have a different domain than the cloaked relying party email address. If the end user profile does not contain a previous association between the third-party address and the cloaked third-party email address, the processor electronics generates a new cloaked third-party email address and associate the new cloaked relying party email address to the end user profile.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by processor electronics, such as one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices 1904 for storing data, e.g., flash memory, magnetic disks, magneto-optical disks, or optical disks. However, a computer need not have such devices. Moreover, a computing device can be embedded in another device, e.g., a mobile telephone ("smart phone"), a personal digital assistant (PDA), a mobile audio or video player, a handheld or fixed game console (e.g. Xbox 360), a Global Positioning System (GPS) receiver, or a portable storage device (e.g., a universal serial bus (USB) flash drive), to name just a few. Devices suitable for storing computer program instructions and data include all forms of volatile or non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device 1908, e.g., an LCD (liquid crystal display), LED (light emitting diode), or OLED (organic light emitting diode) monitor, for displaying information to the user and an input device 1906 such as a keyboard and a pointing device, e.g., a mouse or a trackball, track pad etc., by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. The data processing apparatus 1900 may also include a wireless transceiver 1912 such a cellular radio, WiFi or WiMax transceiver, Bluetooth transceiver and a network connection 1914 etc. The data processing device may also include an output device such as a printer 1910. In addition, the device may include location sensing devices (GPS etc.), as well as clocks and other circuitry (not shown).

Figure 20:
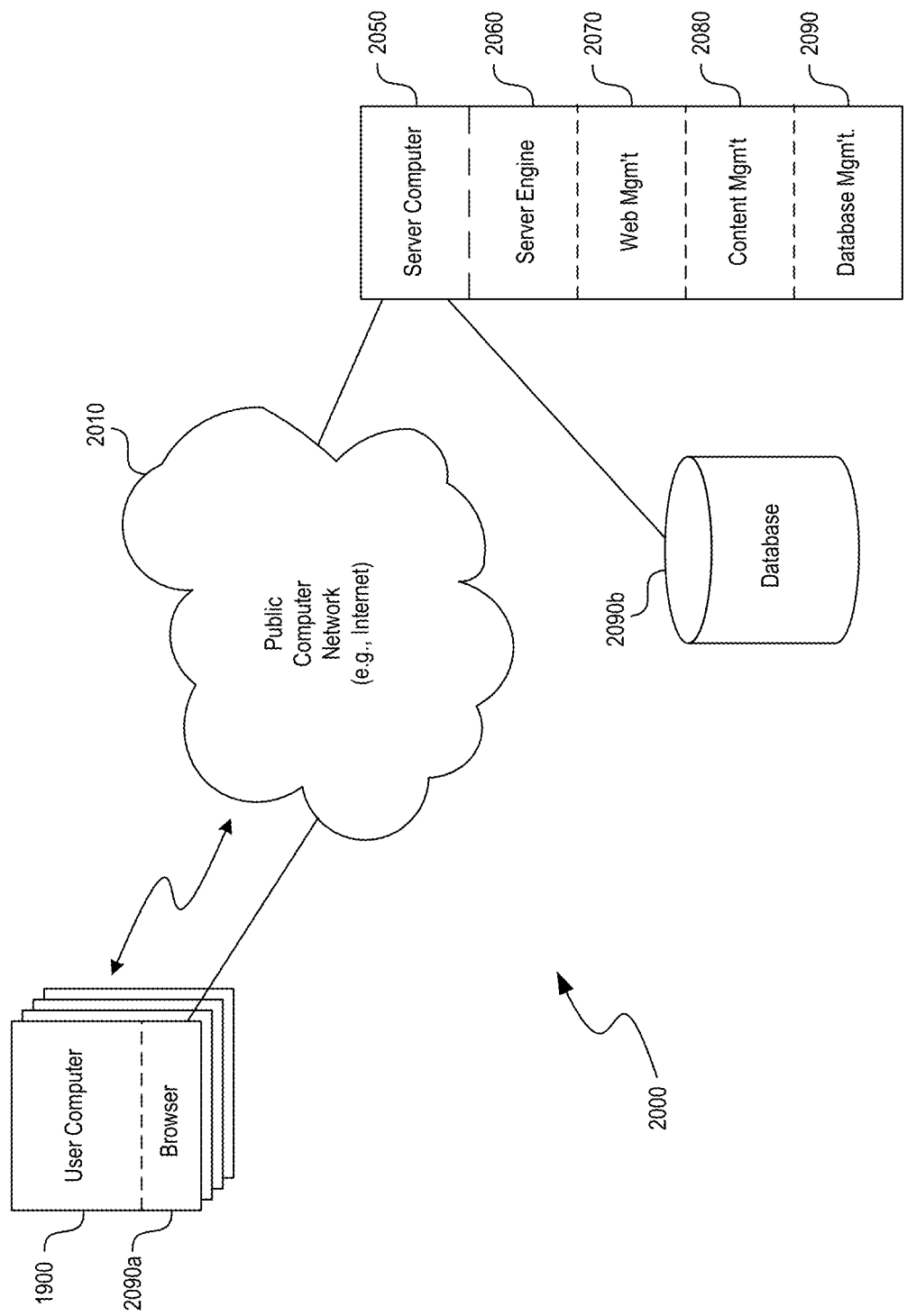
FIG. 20 illustrates one embodiment of a networked computing system used in implementing the disclosed technology.

As shown in FIG. 20, embodiments of the subject matter described in this specification can be implemented in a computing system 2000 that includes a back-end component, e.g., as a data server 2050, or that includes a middleware component, e.g., an application server, or that includes a front-end component, e.g., a client computer 1900 having a graphical user interface or a Web browser 2090a through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a wired or wireless local area network ("LAN") and a wide area network ("WAN"), an inter-network 2010 (e.g., the Internet, and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server 2050 transmits data (e.g., an HTML page) to a client device 1900 (e.g., for purposes of displaying data to and receiving user input from a user interacting with the client device). Data generated at the client device (e.g., a result of the user interaction) can be received from the client device at the server. In the embodiment shown in FIG. 19, the server computer 2050 operates server engine software 2060 and web management software 2070 to receive data from and send data to remote clients. In addition, the server computer operates a database 2090b to store persona information for users who wish to receive ads as described above. Content management software 2080 and database management software 2090 allow the server computer to store and retrieve persona information from the database and to search the database for personas that meet advertiser's criteria for a target audience.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A processor-based ID cloaking system, comprising:
   memory configured to store contents that are executable by processor electronics;
   processor electronics configured to execute the contents in order to:
      receive an email addressed to a cloaked end user address, wherein the email is sent from a relying party email address, and wherein the domain of the cloaked end user address and the domain associated to the processor-based cloaked ID system are the same domain;
      identify an end user specified address as well as any URLs associated to the cloaked end user address based on an end user profile;
      determine whether the end user profile contains a previous association between the relying party email address and a cloaked relying party email address, wherein the relying party email address has a different domain than the cloaked relying party email address;
      in response to determining the end user profile does not contain a previous association between the relying party address and the cloaked relying party email address, generate a new cloaked relying party email address and associate the new cloaked relying party email address to the end user profile, the cloaked end user address and any of the said associated relying-party URLs, wherein the new cloaked relying party email address is generated with a domain different than the relying party address; and
      send the email to the identified end user specified address, wherein the email is configured with a reply-to email address comprising the new cloaked relying party email address.

2. The ID cloaking system of claim 1, wherein the new cloaked relying party email address has a domain that is the same as the cloaked end user address.

3. The ID cloaking system of claim 1, further comprising instructions that are executable by the processor electronics to cause the processor electronics to determine if the email comprises a cloaked placeholder.

4. The ID cloaking system of claim 3, further comprising instructions that are executable by the processor electronics to cause the processor electronics to replace the cloaked placeholder with end user specified information from the end user profile.

5. The ID cloaking system of claim 1, wherein the user profile is further comprised of an end user first name.

6. The ID cloaking system of claim 5, wherein the user profile was configured by the end user to associate the end user first name with a cloaked end user first name placeholder.

7. A non-transitory computer readable medium for a ID cloaking system having instructions stored thereon that are executable by processor electronics to:
   receive an email addressed to a cloaked end user address, wherein the email is sent from a relying party email address, and wherein the domain of the cloaked end user address and the domain associated to the cloaked ID system are the same domain;
   identify an end user specified address as well as any URLs associated to the cloaked end user address by an end user profile;
   determine whether the end user profile contains a previous association between the relying party address and a cloaked relying party email address, wherein the relying party address has a different domain than the cloaked relying party email address;
   where the end user profile does not contain a previous association between the relying party address and the cloaked relying party email address, then generate a new cloaked relying party email address and associate the new cloaked relying party email address to the end user profile, the cloaked end user address and any of the said associated relying-party URLs, wherein the new cloaked relying party email address is generated with a domain different than the relying party address; and
   send the email to the identified end user specified address, wherein the email is configured with a reply-to email address comprising the new cloaked relying party email address.

8. The non-transitory computer readable medium of claim 7, wherein the new cloaked relying party email address has a domain that is the same as the cloaked end user address.

9. The non-transitory computer readable medium of claim 7, further comprising instructions that are executable by the processor electronics to cause the processor electronics to determine if the email comprises a cloaked placeholder.

10. The non-transitory computer readable medium of claim 9, further comprising instructions that are executable by the processor electronics to cause the processor electronics to replace the cloaked placeholder with end user specified information from the end user profile.

11. The non-transitory computer readable medium of claim 7, wherein the user profile is further comprised of an end user first name.

12. The non-transitory computer readable medium of claim 11, wherein the user profile was configured by the end user to associate the end user first name with a cloaked end user first name placeholder.

13. A non-transitory computer readable medium for a ID cloaking system having instructions stored thereon that are executable by processor electronics to:
  receive an email addressed to a cloaked end user address, wherein the email is sent from a relying party email address, and wherein the domain of the cloaked end user address and the domain associated to the cloaked ID system are the same domain;
  identify an end user specified address associated to the cloaked end user address by an end user profile;
  determine whether the end user profile contains a previous association between the relying party address and a cloaked relying party email address, wherein the relying party address has a different domain than the cloaked relying party email address;
  where the end user profile does not contain a previous association between the relying party address and the cloaked relying party email address, then generate a new cloaked relying party email address and associate the new cloaked relying party email address to the end user profile, the cloaked end user address, wherein the new cloaked relying party email address is generated with a domain different than the relying party address; and
  send the email to the identified end user specified address, wherein the email is configured with a reply-to email address comprising the new cloaked relying party email address.

14. The non-transitory computer readable medium 13, wherein the new cloaked relying party email address has a domain that is the same as the cloaked end user address.

15. The non-transitory computer readable medium of claim 13, further comprising instructions that are executable by the processor electronics to cause the processor electronics to determine if the email comprises a cloaked placeholder.

16. The non-transitory computer readable medium of claim 15, further comprising instructions that are executable by the processor electronics to cause the processor electronics to replace the cloaked placeholder with end user specified information from the end user profile.

17. The non-transitory computer readable medium of claim 13, wherein the user profile is further comprised of an end user first name.

18. The non-transitory computer readable medium of claim 17, wherein the user profile was configured by the end user to associate the end user first name with a cloaked end user first name placeholder.

19. The non-transitory computer readable medium of claim 13, wherein the user profile is further comprised of at least one URL associated to the cloaked end user address.

* * * * *